United States Patent
He et al.

(10) Patent No.: US 12,464,251 B2
(45) Date of Patent: Nov. 4, 2025

(54) AUTO-EXPOSURE MANAGEMENT OF MULTI-COMPONENT IMAGES

(71) Applicant: Intuitive Surgical Operations, Inc., Sunnyvale, CA (US)

(72) Inventors: Zhen He, Cupertino, CA (US); Jeffrey M. DiCarlo, Austin, TX (US); Max J. Trejo, San Jose, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 46 days.

(21) Appl. No.: 18/564,310

(22) PCT Filed: Jun. 14, 2022

(86) PCT No.: PCT/US2022/033469
§ 371 (c)(1),
(2) Date: Nov. 27, 2023

(87) PCT Pub. No.: WO2022/266126
PCT Pub. Date: Dec. 22, 2022

(65) Prior Publication Data
US 2024/0259690 A1    Aug. 1, 2024

Related U.S. Application Data

(60) Provisional application No. 63/210,811, filed on Jun. 15, 2021.

(51) Int. Cl.
*H04N 23/71* (2023.01)
*A61B 5/00* (2006.01)
(Continued)

(52) U.S. Cl.
CPC .......... *H04N 23/71* (2023.01); *A61B 5/0071* (2013.01); *H04N 23/11* (2023.01); *H04N 23/72* (2023.01);
(Continued)

(58) Field of Classification Search
CPC ........ H04N 23/71; H04N 23/11; H04N 23/72; H04N 23/73; H04N 23/74; H04N 23/76; A61B 5/0071; A61B 2505/05
See application file for complete search history.

(56) References Cited

U.S. PATENT DOCUMENTS

| 10,609,298 B2 * | 3/2020 | Duran .................... H04N 23/76 |
| 2005/0203423 A1 * | 9/2005 | Zeng ...................... G01J 3/0218 600/476 |

(Continued)

OTHER PUBLICATIONS

International Preliminary Report on Patentability for Application No. PCT/US2022/033469, mailed Dec. 28, 2023, 09 pages.

(Continued)

*Primary Examiner* — Jared Walker

(57) ABSTRACT

An illustrative apparatus may obtain an image frame captured by an image capture system in accordance with an auto-exposure parameter set to a first setting. The image frame may include a first image component associated with visible light and a second image component associated with non-visible light. The apparatus may determine a first auto-exposure gain based on the first image component and may determine a second auto-exposure gain based on the second image component. Based on the first and second auto-exposure gains, the apparatus may determine a second setting for the auto-exposure parameter. The second setting may be configured to be used by the image capture system to capture a subsequent image frame. Corresponding apparatuses, systems, and methods for managing auto-exposure of multi-component image frames are also disclosed.

19 Claims, 12 Drawing Sheets

(51) Int. Cl.
*H04N 23/11* (2023.01)
*H04N 23/72* (2023.01)
*H04N 23/73* (2023.01)
*H04N 23/74* (2023.01)
*H04N 23/76* (2023.01)

(52) U.S. Cl.
CPC ............ *H04N 23/73* (2023.01); *H04N 23/74* (2023.01); *H04N 23/76* (2023.01); *A61B 2505/05* (2013.01)

(56) References Cited

U.S. PATENT DOCUMENTS

| | | | |
|---|---|---|---|
| 2016/0065926 A1* | 3/2016 | Nonaka | H04N 23/88 348/164 |
| 2018/0035043 A1* | 2/2018 | Hesch | H04N 23/62 |
| 2018/0228352 A1* | 8/2018 | Kojima | A61B 1/0638 |
| 2019/0068890 A1* | 2/2019 | Kazama | H04N 25/46 |
| 2019/0213723 A1* | 7/2019 | Luo | G06T 5/92 |
| 2019/0246025 A1* | 8/2019 | Duran | H04N 23/20 |
| 2021/0195081 A1* | 6/2021 | Verma | H04N 23/74 |
| 2021/0368087 A1* | 11/2021 | Ratcliff | G06T 7/155 |

OTHER PUBLICATIONS

International Search Report and Written Opinion for Application No. PCT/US2022/033469, mailed Sep. 21, 2022, 12 pages.
Vertut, J., and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

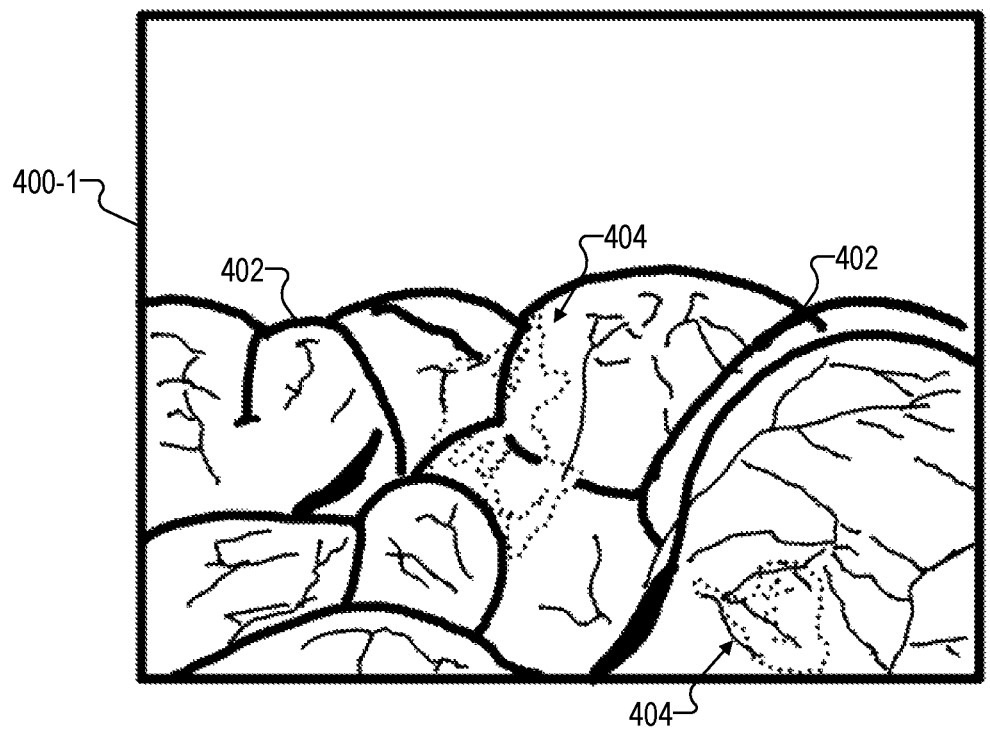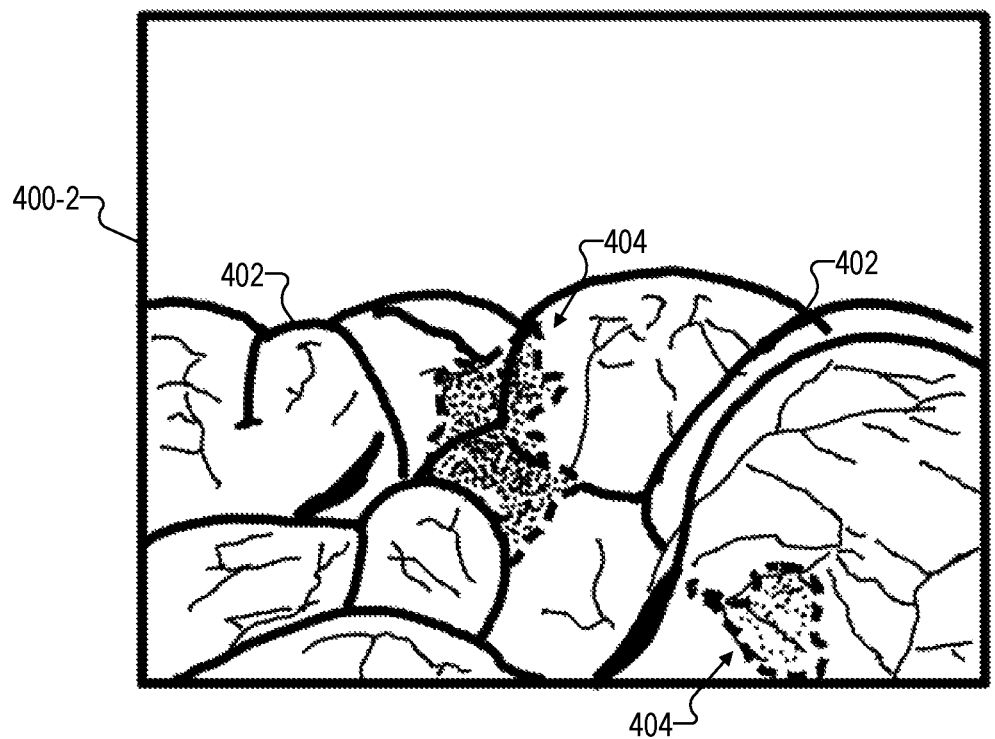
Fig. 4

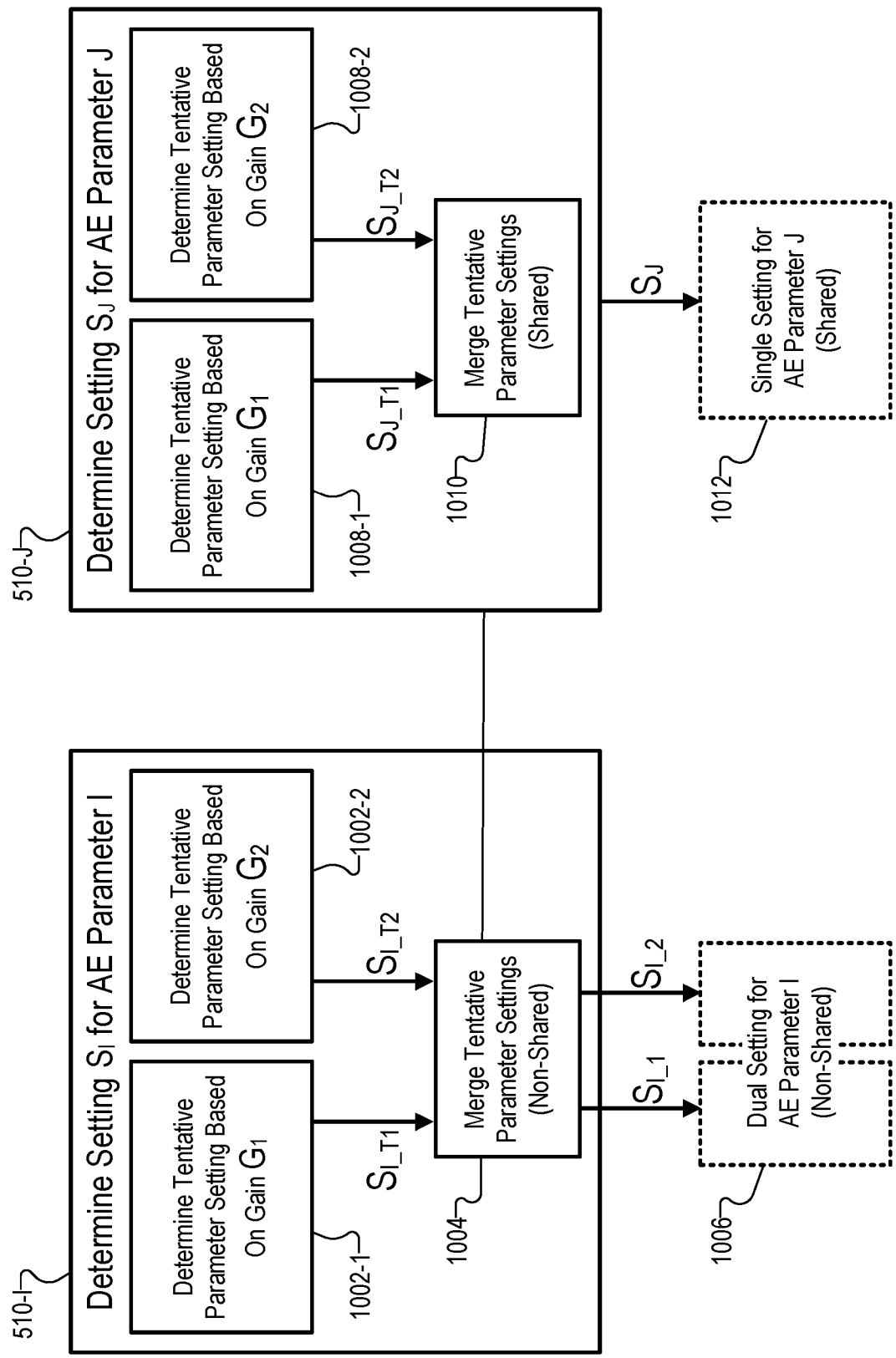

AUTO-EXPOSURE MANAGEMENT OF MULTI-COMPONENT IMAGES

RELATED APPLICATIONS

The present application is a U.S. National Stage Application under 35 U.S.C. § 371 of International Application No. PCT/US2022/033469, filed on Jun. 14, 2022, which claims priority to U.S. Provisional Patent Application Ser. No. 63/210,811, filed Jun. 15, 2021, each of which is hereby incorporated by reference in its entirety.

BACKGROUND INFORMATION

Auto-exposure algorithms are used when images are captured and processed to help ensure that content depicted in the images is properly exposed (e.g., neither underexposed so as to look too dark nor overexposed so as to look too bright). While conventional auto-exposure algorithms adequately serve many types of images, certain properties of images that include multiple image components may render conventional auto-exposure algorithms suboptimal or inadequate in various ways. For instance, a multi-component image will be considered that includes a first image component associated with visible light (e.g., an image component depicting scene content that reflects visible light) and a second image component associated with non-visible light (e.g., an image component depicting scene content that fluoresces when excited by non-visible light). For this multi-component image, conventional auto-exposure algorithms may adjust auto-exposure parameters to reach a target luminance that accounts for the first image component but fails to account for distinctive properties of the second image component. Consequently, the second image component may be overexposed or underexposed, which may cause important details that would otherwise by depicted by the image to be lost or obscured.

SUMMARY

The following description presents a simplified summary of one or more aspects of the apparatuses, systems, and methods described herein. This summary is not an extensive overview of all contemplated aspects and is intended to neither identify key or critical elements of all aspects nor delineate the scope of any or all aspects. Its sole purpose is to present one or more aspects of the systems and methods described herein as a prelude to the detailed description that is presented below.

An illustrative apparatus for auto-exposure management of multi-component images may include one or more processors and memory storing executable instructions that, when executed by the one or more processors, cause the apparatus to perform various operations described herein. For example, the apparatus may obtain an image frame captured by an image capture system in accordance with an auto-exposure parameter that is set to a first setting. The image frame may include a first image component associated with visible light and a second image component associated with non-visible light. The apparatus may determine a first auto-exposure gain based on the first image component, and may determine a second auto-exposure gain based on the second image component. Based on the first and second auto-exposure gains, the apparatus may determine a second setting for the auto-exposure parameter. The second setting may be configured to be used by the image capture system to capture a subsequent image frame.

An illustrative method for auto-exposure management of multi-component images may include various operations described herein, each of which may be performed by a computing device such as an auto-exposure management apparatus described herein. For example, the method may include determining a first auto-exposure gain based on a first image component that is included in an image frame captured by an image capture system and that is associated with visible light; determining a second auto-exposure gain based on a second image component that is included in the image frame and that is associated with non-visible light; and, based on the first and second auto-exposure gains, determining a setting for an auto-exposure parameter that is used by the image capture system to capture a subsequent image frame.

An illustrative non-transitory computer-readable medium may store instructions that, when executed, cause one or more processors of a computing device to perform various operations described herein. For example, the one or more processors may determine a first auto-exposure gain based on a first image component that is included in an image frame captured by an image capture system and that is associated with visible light; determine a second auto-exposure gain based on a second image component that is included in the image frame and that is associated with non-visible light; and, based on the first and second auto-exposure gains, determine a setting for an auto-exposure parameter that is used by the image capture system to capture a sequence of image frames including the image frame.

An illustrative system for auto-exposure management of multi-component images may include a first illumination source configured to illuminate tissue within a body with visible light during a performance of a medical procedure, a second illumination source configured to illuminate the tissue with non-visible light during the performance of the medical procedure, an image capture device configured to capture an image frame in accordance with an auto-exposure parameter set to a first setting, and one or more processors. The image frame may depict an internal view of the body that features the tissue illuminated by the first and second illumination sources. The one or more processors may be configured to determine a first auto-exposure gain based on a first image component that is included in the image frame and that is associated with the visible light; determine a second auto-exposure gain based on a second image component that is included in the image frame and that is associated with the non-visible light; and determine a second setting for the auto-exposure parameter based on the first and second auto-exposure gains. The second setting may be configured to be used by the image capture device to capture a subsequent image frame.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 4 shows multi-component image frames that illustrate the results of applying auto-exposure management principles described herein.

FIGS. 10A-10B show illustrative ways of determining settings for different types of auto-exposure parameters based on auto-exposure gains of different image components in accordance with principles described herein.

DETAILED DESCRIPTION

Figure 1:
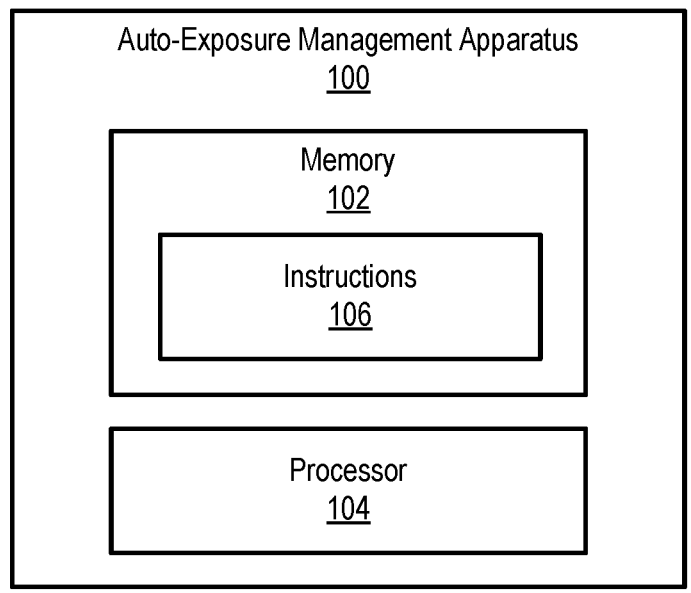
FIG. 1 shows an illustrative auto-exposure management apparatus for auto-exposure management of multi-component images in accordance with principles described herein.

Apparatuses, systems, and methods for managing auto-exposure of multi-component image frames are described herein. As will be described in detail, novel techniques and additional considerations that may be accounted for may help improve auto-exposure management for multi-component image frames (e.g., image frames that include both visible light content illuminated by light in the visible spectrum, as well as fluorescent content illuminated by non-visible light such as infrared light).

Auto-exposure management may involve setting various types of auto-exposure parameters associated with an image capture system and/or a component thereof. For instance, auto-exposure parameters may be associated with a camera or other image capture device included in the image capture system, an illumination source operating with the image capture device, an analysis module that processes data captured by the image capture device, communicative components of the system, or the like. A few non-limiting examples of auto-exposure parameters that may be managed by an auto-exposure management system may include exposure time, shutter aperture, illumination intensity, various luminance gains (e.g., an analog gain, a Red-Green-Blue (RGB) gain, a Bayer gain, etc.), and so forth.

Conventional auto-exposure algorithms operate by determining how much light is present in a scene (e.g., based on an analysis of one image of the scene), and attempting to optimize the auto-exposure parameters of an image capture system to cause the image capture system to provide a desired amount of exposure (e.g., for subsequent images that are to be captured by the image capture system). These auto-exposure algorithms have conventionally set auto-exposure parameters exclusively based on scene content that reflects visible light, even if other scene content (e.g., scene content that fluoresces to emit visible light when excited by non-visible light) is also present. As a result, the fluorescent content has sometimes become saturated or washed out based on factors that are not being accounted for (e.g., the dilution of fluorescent dyes, the amount of time that the dyes have been activated by non-visible light, etc.).

Accordingly, apparatuses, methods, and systems described herein feature a dual auto-exposure algorithm that may account, separately and independently, for at least two different image components included in each image frame of a captured frame sequence: 1) a first image component associated with visible light (e.g., visible light content illuminated by a visible light illumination source), and 2) a second image component associated with non-visible light (e.g., fluorescence content emitted when exposed to a non-visible light illumination source such as a source emitting infrared light). As will be described in detail herein, after determining desired auto-exposure gains and parameters for each image component, the apparatuses and systems described herein may merge these tentative (e.g., desired) auto-exposure parameters for each image component strategically such that both the first and second image components are adequately accounted for to appear properly illuminated. In this way, images are exposed in a way that properly illuminates visible light content while also ensuring that fluorescence content is neither overexposed (e.g., saturated) nor underexposed (e.g., washed out).

Implementations described herein may find application with a variety of different types of multi-component images captured or generated in various use cases by different types of image processing systems. For example, scientific image capture using different light filters and/or frequencies, augmented reality or other forms of mixed reality imaging that superimpose one type of image content (e.g., virtual content) onto other image content (e.g., real-world content), and various other such examples in which images are processed in terms of different image components may benefit from principles described herein. With this wide breadth of applicability in mind, however, a particular illustrative use case related to fluorescence-assisted medical imaging will be used throughout this description to describe and illustrate principles of auto-exposure management of multi-component images.

Certain medical imaging systems (e.g., endoscopic image capture systems, etc.) are configured to capture fluorescence images of a surgical scene within a patient while the patient undergoes a medical procedure (e.g., a surgical procedure, an imaging or other exploratory procedure, etc.). The fluorescence images may allow medical personnel (e.g., surgeons, surgical team members, etc.) to readily identify cellular activity or structures (e.g., tumors, lymphatics, blood vasculature, other anatomical structures, etc.) within the surgical area during the procedure. To facilitate fluorescence imaging, a fluorescence imaging agent may be introduced (e.g., injected) into a bloodstream or other anatomical feature of the patient. The fluorescence imaging agent may include any suitable dye, protein, or other substance that emits fluorescence illumination when exposed to fluorescence excitation illumination generated by a fluorescence excitation illumination source (e.g., a non-visible light illumination source such as an infrared light source) included in an image capture system such as a medical imaging system. The medical imaging system may capture the fluorescence content illuminated by the fluorescence excitation illumination source together with visible light content illuminated by a visible light illumination source, and may provide a multi-component image (or a series of multi-component image frames) that depict both the visible light content and the fluorescence content of the surgical scene.

One challenge of using fluorescence-enhanced imaging such as described above is that conventional auto-exposure algorithms are not configured to account for certain characteristics unique to fluorescence content. For example, fluorescence signal visibility within an image may be highly dependent on dilution ratio of the fluorescence imaging agent, how much time has elapsed since the agent was introduced, and the like, yet these characteristics may not be factored into conventional auto-exposure management algorithms in any way. Consequently, for example, a fluorescence imaging agent with a low dilution ratio (e.g., a 1:1 ratio) may cause fluorescence content to become saturated and structure detail to be lost by being too bright, while a fluorescence imaging agent with a high dilution ratio (e.g., a 1:1000 ratio) may cause fluorescence content to be so faint as to be barely visible in the image. Even if this weak fluorescence content signal is visible using certain fluorescence imaging modes that display the fluorescence content against a darkened background, a user (e.g., a surgeon) wishing to view the fluorescence content against the actual visual light background may struggle to see the fluorescence content at all.

Accordingly, as mentioned above and as will be described and illustrated in more detail below, implementations described herein may apply a dual auto-exposure management algorithm that accounts for both visible light content of a first image component of each image frame captured at the surgical scene and fluorescence content of a second image component of each image frame. By determining respective auto-exposure gains and desired auto-exposure parameter settings for each of these image components independently, apparatuses and systems described herein may strategically merge or combine these settings so as to ensure that both types of content are well accounted for regardless of what the dilution ratios or other such attributes may be in a particular situation.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Apparatuses, methods, and systems, described herein may provide any of the benefits mentioned above, as well as various additional and/or alternative benefits that will be described and/or made apparent below.

FIG. 1 shows an illustrative auto-exposure management apparatus 100 (apparatus 100) for auto-exposure management of multi-component images in accordance with principles described herein. Apparatus 100 may be implemented by computer resources (e.g., processors, memory devices, storage devices, etc.) included within an image capture system (e.g., an endoscopic or other medical imaging system, etc.), by computer resources of a computing system associated with an image capture system (e.g., communicatively coupled to the image capture system), and/or by any other suitable computing resources as may serve a particular implementation.

As shown, apparatus 100 may include, without limitation, a memory 102 and a processor 104 selectively and communicatively coupled to one another. Memory 102 and processor 104 may each include or be implemented by computer hardware that is configured to store and/or process computer instructions (e.g., software, firmware, etc.). Various other components of computer hardware and/or software not explicitly shown in FIG. 1 may also be included within apparatus 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause apparatus 100 to perform any of the functionality described herein. Instructions 106 may be implemented by any suitable application, software, firmware, code, script, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), image signal processors, or the like. Using processor 104 (e.g., when processor 104 is directed to perform operations represented by instructions 106 stored in memory 102), apparatus 100 may perform various functions associated with auto-exposure management of multi-component images in accordance with principles described herein.

Figure 2:
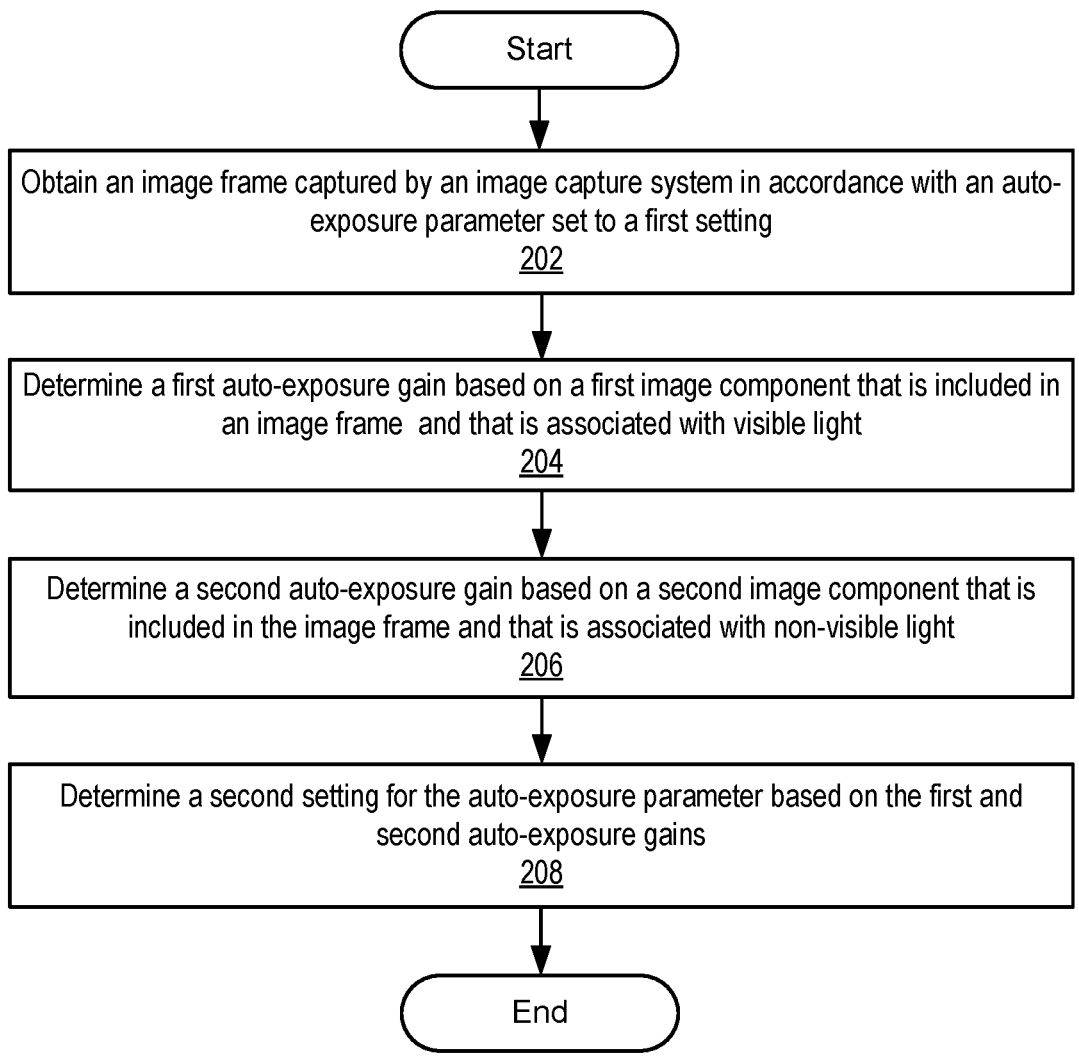
FIG. 2 shows an illustrative auto-exposure management method for auto-exposure management of multi-component images in accordance with principles described herein.

As one example of functionality that processor 104 may perform, FIG. 2 shows an illustrative auto-exposure management method 200 (method 200) for auto-exposure management of multi-component images that apparatus 100 may perform in accordance with principles described herein. While FIG. 2 illustrates illustrative operations according to one embodiment, other embodiments may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by an auto-exposure management apparatus (e.g., apparatus 100), an auto-exposure management system (e.g., an implementation of an auto-exposure management system described below), and/or any implementation thereof.

In some examples, certain operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, real time will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-210 of method 200 will now be described in more detail as the operations may be performed by apparatus 100 (e.g., by processor 104 as processor 104 executes instructions 106 stored in memory 102).

At operation 202, apparatus 100 may obtain an image frame captured by an image capture system. The image frame may be implemented as a multi-component image that includes (e.g., that is able to be decoupled into) at least a first image component associated with visible light and a second image component associated with non-visible light. For example, as will be described and illustrated in more detail below, the first image component may depict image content illuminated by a visible light illumination source while the second image component may depict image content that fluoresces under the influence of a non-visible light illumination source such as a source of infrared illumination.

The image capture system may capture the image frame at operation 202 as part of capturing a sequence of image frames. For instance, the image frame may be one frame of a video file or streaming video captured and provided by the image capture system. Additionally, the image frame may be captured in accordance with an auto-exposure parameter set to a first setting. For example, as will be described in more detail below, the auto-exposure parameter may be implemented as various types of parameters including an exposure time parameter (where the first setting would represent a particular amount of time that the image frame is exposed), a particular type of gain parameter (where the first setting would represent a particular amount of that type of gain that is applied to the captured image frame), an illumination intensity parameter (where the first setting would represent a particular amount of illumination that was generated by an illumination source to illuminate the scene when the image frame was captured), or another suitable auto-exposure parameter.

At operation 204, apparatus 100 may determine a first auto-exposure gain based on the first image component included in the image frame obtained at operation 202. For example, as will be described in more detail below, apparatus 100 may analyze the first image component independently from other image content of the image frame (e.g., independently from the second image component) to access and/or determine an auto-exposure value and an auto-exposure target for the first image component, then may determine the first auto-exposure gain based on the auto-exposure value and auto-exposure target (e.g., by computing the quotient of the auto-exposure target divided by the auto-exposure value or in another suitable way).

Similarly, at operation 206, apparatus 100 may determine a second auto-exposure gain based on the second image component included in the image frame obtained at operation 202. For instance, in like manner as for the first image component analyzed at operation 204, apparatus 100 may analyze the second image component independently from other image content of the image frame (e.g., independently from the first image component) to access and/or determine an auto-exposure value and an auto-exposure target for the second image component, then may determine the second auto-exposure gain based on the auto-exposure value and auto-exposure target.

As used herein, an auto-exposure value will be understood to represent one or more auto-exposure-related characteristics (e.g., luminance, signal intensity, chrominance, etc.) of a particular image frame or portion thereof (e.g., image component, pixel, group of pixels, etc.). For example, such characteristics may be detected by analyzing the image frame captured by the image capture system. A frame auto-exposure value may refer to an average luminance determined for pixels of an entire image frame, while a component auto-exposure value or pixel auto-exposure value may refer to an average luminance determined for a particular image component or pixel of the image frame, respectively.

In any such example, it will be understood that the average luminance (and/or one or more other average exposure-related characteristics in certain examples) referred to by an auto-exposure value may be determined as any type of average as may serve a particular implementation. For instance, an auto-exposure value may refer to a mean luminance of an image frame or portion thereof, determined by summing respective luminance values for each pixel or pixel group of the frame or image component and then dividing the sum by the total number of values. As another example, an auto-exposure value may refer to a median luminance of the image frame or portion thereof, determined as the central luminance value when all the respective luminance values for each pixel or pixel group of the frame or image component are ordered by value. As yet another example, an auto-exposure value may refer to a mode luminance of the image frame or portion thereof, determined as whichever luminance value, of all the respective luminance values for each pixel or pixel group of the image frame or image component, is most prevalent or repeated most often. In other examples, other types of averages (besides mean, median, or mode) and other types of exposure-related characteristics (besides luminance) may also be used to determine an auto-exposure value in any manner as may serve a particular implementation.

As used herein, an auto-exposure target will be understood to refer to a target (e.g., a goal, a desirable value, an ideal, an optimal value, etc.) for the auto-exposure value of a particular image frame or portion thereof (e.g., image component, pixel, pixel group, etc.). Apparatus 100 may determine the auto-exposure target, based on the particular circumstances and any suitable criteria, for the auto-exposure-related characteristics represented by the auto-exposure values. For example, auto-exposure targets may be determined at desirable levels of luminance (or other exposure-related characteristics) such as a luminance level associated with middle gray or the like. As such, a frame auto-exposure target may refer to a desired target luminance determined for pixels of an entire image frame, while a component or pixel auto-exposure target may refer to a desired target luminance determined for a particular image component or pixel of the image frame, respectively.

In some examples, an auto-exposure target for a particular image frame or region may be determined as an average of the respective auto-exposure targets of pixels or pixel groups included within that image frame or image component. For example, similarly as described above in relation to how auto-exposure values may be averaged, a mean, median, mode, or other suitable type of auto-exposure target average may be computed to determine an auto-exposure target for an image frame or portion or component thereof.

Each auto-exposure gain determined at operations 204 and 206 may correspond to a ratio of the respective auto-exposure target to the respective auto-exposure value of the image component. In this way, if the component auto-exposure value for the first or second image component is already equal to the component auto-exposure target for that image component (e.g., such that no further adjustment is needed to align to the target), the determined auto-exposure gain may be set to a gain of 1, so that the system will neither try to boost nor attenuate the auto-exposure values for subsequent frames to be captured by the image capture system. Conversely, if a particular component auto-exposure target is different from the corresponding component auto-exposure value, the determined auto-exposure gain may be set to correspond to a value less than or greater than 1 to cause the system to either boost or attenuate the auto-exposure values for the subsequent frames in an attempt to make the auto-exposure values more closely align with the desired auto-exposure target.

At operation 208, apparatus 100 may determine a second setting for the auto-exposure parameter (e.g., the same auto-exposure parameter referred to above with respect to the first setting that was used to capture the image frame). This second setting for the auto-exposure parameter may be configured to be used by the image capture system to capture one or more subsequent image frames (e.g., later image frames in the sequence of image frames being captured by the image capture system). For example, the second setting may be a slightly longer or shorter exposure time to which an exposure time parameter is to be set, a slightly higher or lower gain to which a particular gain parameter is to be set, or the like.

The determining of the second setting at operation 208 may be performed based on the first auto-exposure gain determined at operation 204 and the second auto-exposure gain determined at operation 206. In this way, auto-exposure management will not only account for visible light content associated with the first image component when capturing subsequent image frames, but will also account for fluorescence content (or other content associated with non-visible light) associated with the second image component. As will be further described below, additional operations may follow operation 208, such as updating the auto-exposure parameter to reflect the second setting determined at operation 208, obtaining and processing subsequent image frames, and so forth.

Apparatus 100 may be implemented by one or more computing devices or by computing resources of a general purpose or special purpose computing system such as will be described in more detail below. In certain embodiments, the one or more computing devices or computing resources implementing apparatus 100 may be communicatively coupled with other components such as an image capture system used to capture the image frames that apparatus 100 processes. In other embodiments, apparatus 100 may be included within (e.g., implemented as a part of) an auto-exposure management system. Such an auto-exposure management system may be configured to perform all the same functions described herein to be performed by apparatus 100 (e.g., including the operations of method 200, described above), but may further incorporate additional components such as the image capture system so as to also be able to perform the functionality associated with these additional components.

Figure 3:
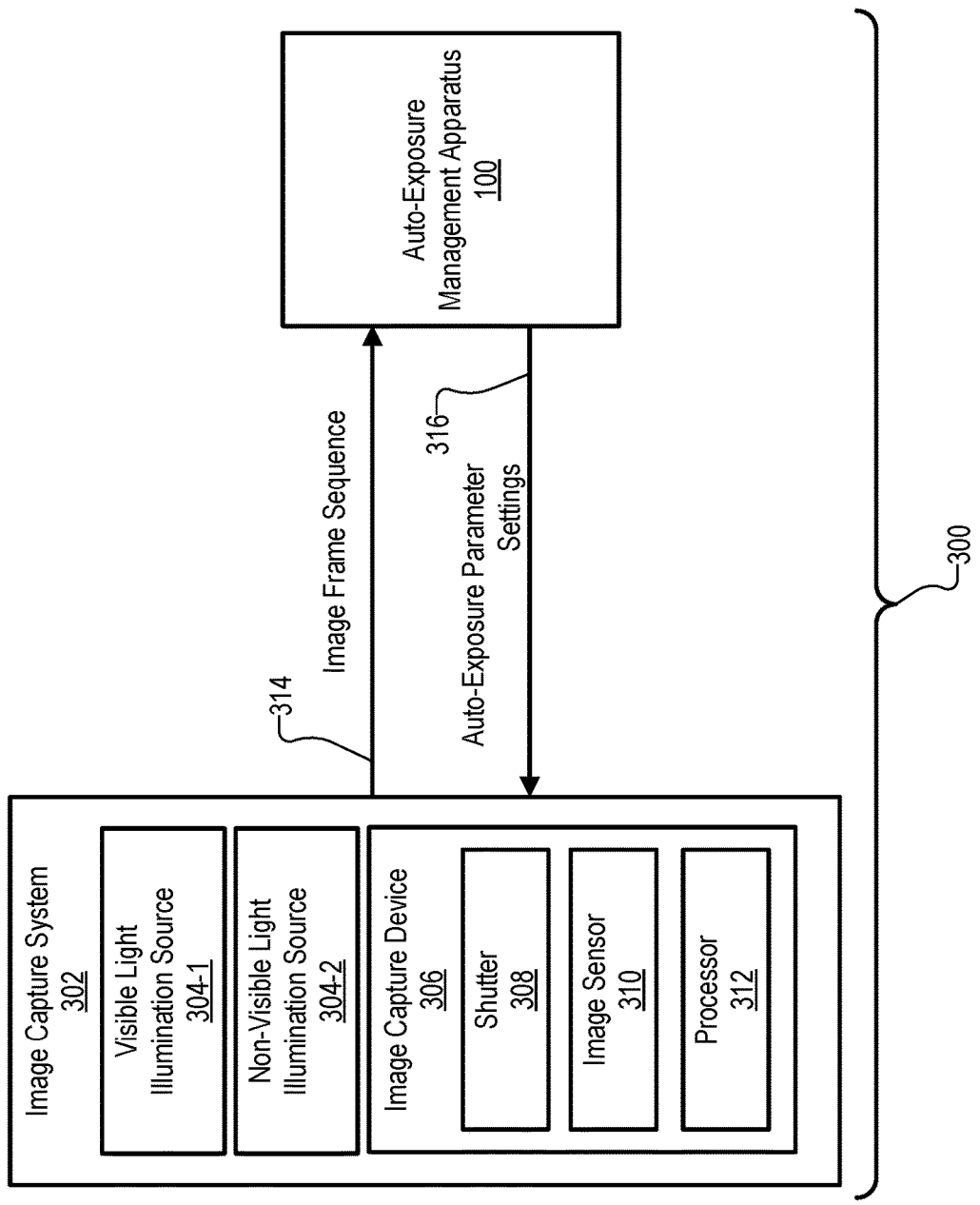
FIG. 3 shows an illustrative auto-exposure management system for auto-exposure management of multi-component images in accordance with principles described herein.

To illustrate, FIG. 3 shows an illustrative auto-exposure management system 300 (system 300) for auto-exposure management of multi-component images in accordance with principles described herein. As shown, system 300 may include an implementation of apparatus 100 together with an image capture system 302 that includes at least two illumination sources 304 (e.g., a visible light illumination source 304-1 and a non-visible light illumination source 304-2) and an image capture device 306 that incorporates a shutter 308, an image sensor 310, and a processor 312 (e.g., one or more image signal processors implementing an image signal processing pipeline). Within system 300, apparatus 100 and image capture system 302 may be communicatively coupled to allow image capture system 302 to capture and provide an image frame sequence 314 and/or other suitable captured image data, as well as to allow apparatus 100 to direct image capture system 302 in accordance with operations described herein (e.g., to provide updates to various auto-exposure parameter settings 316). Image capture system 302 will now be described.

Each illumination source 304 may be implemented by any type of source of illumination (e.g., visible light, fluorescence excitation illumination such as near-infrared light, etc.) and may be configured to interoperate with image capture device 306 within image capture system 302. Because example image frames described herein are generally multi-component image frames that include image components associated with different types of light (e.g., visible light and non-visible light), two different illumination sources 304 are shown to be included in image capture system 302.

Visible light illumination source 304-1 may be configured to emit visible light (e.g., light in the visible light portion of the electromagnetic spectrum) to thereby illuminate objects with visible light. For example, visible light illumination source 304-1 may illuminate tissue within a body (e.g., a body of a live animal, a human or animal cadaver, a portion of human or animal anatomy, tissue removed from human or animal anatomies, non-tissue work pieces, training models, etc.) with visible light during a performance of a medical procedure (e.g., a surgical procedure, etc.).

Non-visible light illumination source 304-2 may be configured to emit non-visible light to illuminate tissue within a body undergoing a fluorescence-guided medical procedure with non-visible light during the performance of the medical procedure. In such fluorescence-guided medical procedures, a portion of the tissue may include (e.g., may be injected with) a fluorescence imaging agent that fluoresces (e.g., emitting visible light) when illuminated by non-visible light illumination source 304-2. To this end, non-visible light illumination source 304-2 may emit light at any frequency that may cause a particular fluorescence imaging agent to fluoresce. For instance, non-visible light illumination source 304-2 may emit infrared light having a wavelength in an infrared light region of the electromagnetic spectrum (e.g., a wavelength between approximately 700 nm (the edge of the red visible light region) to around 1 mm). In some examples, non-visible light illumination source 304-2 may emit infrared light having a wavelength included in the near-infrared light region (e.g., a wavelength between approximately 700 nm to about 950 nm). For instance, non-visible light illumination source 304-2 may emit light having a wavelength of 785 nm or 803 nm in two specific examples corresponding to particular fluorescence imaging agents.

Image capture device 306 may be configured to capture image frames in accordance with one or more auto-exposure parameters that are set to whatever auto-exposure parameter settings 316 are directed by apparatus 100. Image capture device 306 may be implemented by any suitable camera or other device configured to capture images of a scene. For instance, in a medical procedure example, image capture device 306 may be implemented by an endoscopic imaging device configured to capture image frame sequence 314, which may include an image frame depicting an internal view of the body that features the tissue illuminated by illumination sources 304. As shown, image capture device 306 may include components such as shutter 308, image sensor 310, and processor 312.

Image sensor 310 may be implemented by any suitable image sensor, such as a charge coupled device (CCD) image sensor, a complementary metal-oxide semiconductor (CMOS) image sensor, or the like.

Shutter 308 may interoperate with image sensor 310 to assist with the capture and detection of light from the scene. For example, shutter 308 may be configured to expose image sensor 310 to a certain amount of light for each image frame captured. Shutter 308 may comprise an electronic shutter and/or a mechanical shutter. Shutter 308 may control how much light image sensor 310 is exposed to by opening to a certain aperture size defined by a shutter aperture parameter and/or for a specified amount of time defined by an exposure time parameter. As will be described in more detail below, these or other shutter-related parameters may be included among the auto-exposure parameters that apparatus 100 is configured to determine, update, and adjust.

Processor 312 may be implemented by one or more image signal processors configured to implement at least part of an image signal processing pipeline. Processor 312 may process auto-exposure statistics input (e.g., by tapping the signal in the middle of the pipeline to detect and process various auto-exposure data points and/or other statistics), perform optics artifact correction for data captured by image sensor 310 (e.g., by reducing fixed pattern noise, correcting defective pixels, correcting lens shading issues, etc.), perform signal reconstruction operations (e.g., white balance operations, demosaic and color correction operations, etc.), apply image signal analog and/or digital gains, and/or perform any other functions as may serve a particular implementation. Various auto-exposure parameters may dictate how the functionality of processor 312 is to be performed. For example, auto-exposure parameters may be set to define the analog and/or digital gains processor 312 applies, as will be described in more detail below.

In some examples, an endoscopic implementation of image capture device 306 may include a stereoscopic endoscope that includes two full sets of image capture components (e.g., two shutters 308, two image sensors 310, etc.) to accommodate stereoscopic differences presented to the two eyes (e.g., left eye and right eye) of a viewer of the captured image frames. Conversely, in other examples, an endoscopic implementation of image capture device 306 may include a monoscopic endoscope with a single shutter 308, a single image sensor 310, and so forth.

Apparatus 100 may be configured to control the settings 316 for various auto-exposure parameters of image capture system 302. As such, apparatus 100 may adjust the settings 316 for these auto-exposure parameters in real time based on incoming image data (e.g., image frame sequence 314) captured by image capture system 302. As mentioned above, certain auto-exposure parameters of image capture system 302 may be associated with shutter 308 and/or image sensor 310. For example, apparatus 100 may direct shutter 308 in accordance with an exposure time parameter corresponding to how long the shutter is to allow image sensor 310 to be exposed to the scene, a shutter aperture parameter corresponding to an aperture size of the shutter, or any other suitable auto-exposure parameters associated with the shutter. Other auto-exposure parameters may be associated with aspects of image capture system 302 or the image capture process unrelated to shutter 308 and/or sensor 310. For example, apparatus 100 may adjust an illumination intensity parameter of illumination source 304-1 that corresponds to an intensity of visible light illumination provided by illumination source 304-1, an illumination duration parameter corresponding to a time period during which visible light illumination is provided by illumination source 304-1, or the like. Similar illumination intensity parameters may also be set for illumination source 304-2 to control fluorescence excitation illumination and/or other non-visible light emissions. As another example, apparatus 100 may adjust gain parameters corresponding to one or more analog and/or digital gains (e.g., an analog gain parameter, a Bayer gain parameter, an RGB gain parameter, etc.) applied by processor 312 to luminance data generated by image sensor 310.

Any of these or other suitable parameters, or any combination thereof, may be updated and/or otherwise adjusted by apparatus 100 for subsequent image frames based on an analysis of the current image frame. For instance, in one example where the auto-exposure gain is determined to be 6.0, various auto-exposure parameters could be set as follows: 1) a current illumination intensity parameter may be set to 100% (e.g., maximum output); 2) an exposure time parameter may be set to $1/60^{th}$ of a second (e.g., 60 fps); 3) an analog gain may be set to 5.0 (with a cap of 10.0); 4) a Bayer gain may be set to 1.0 (with a cap of 3.0); and 5) an RGB gain may be set to 2.0 (with a cap of 2.0). With these settings, the gain is distributed across the analog gain (10.0/5.0=2.0), Bayer gain (3.0/1.0=3.0), and RGB gain (2.0/2.0=1.0) to establish the desired 6.0 total auto-exposure gain (3.0*2.0*1.0=6.0) for the frame.

The timing at which parameters are changed may be applied carefully by system 300 so as to adjust auto-exposure effects gradually and without abrupt and/or noticeable changes. For example, even if apparatus 100 determines that a relatively large update is called for with respect to a particular auto-exposure parameter setting, the setting may be changed slowly over a period of time (e.g., over the course of several seconds, etc.) or in stages (e.g., frame by frame) so as not to create a jittery and undesirable effect to be perceived by the user, as well as to avoid responding too quickly to outlier data that may not actually represent the most desirable settings for the auto-exposure parameters.

FIG. 4 shows two different multi-component image frames 400, labeled as image frames 400-1 and 400-2, respectively, that illustrate the results of applying auto-exposure management principles described herein. Specifically, image frame 400-1 illustrates a multi-component image frame in which auto-exposure management is performed in a conventional manner so as to account for various elements 402 of a first image component of the image frame that is associated with visible light while not accounting for elements 404 of a second image component of the image frame that is associated with non-visible light. In contrast, image frame 400-2 illustrates a multi-component image frame in which auto-exposure management is performed in accordance with principles described herein so as to account both for elements 402 of the first image component and elements 404 of the second image component so that both image components may be easily examined at a high level of detail.

In image frames 400, elements 402 of the first image component associated with the visible light may represent any suitable image content associated with visible light. For example, image frames may each depict a scene of a medical procedure captured endoscopically within a body undergoing the procedure. In this example, elements 402 of the first image component may be understood to represent internal anatomy (e.g., tissue, vasculature, a portion of an internal organ or other anatomical structure, etc.) that is illuminated by visible light at the scene, while elements 404 of the second image component may be understood to represent areas of the tissue that are fluorescing due to being injected with a fluorescent imaging agent and being exposed to a fluorescence excitation illumination source of non-visible light (e.g., a near-infrared illumination source, etc.).

As shown in image frame 400-1, in which the second image component including elements 404 is not accounted for separately from the first image component including elements 402, elements 404 are faint and difficult to see in detail. In this example, the second image component may represent fluorescence content when a dilution of a fluorescence imaging agent is relatively high and/or a time elapsed since the agent was introduced is relatively low. That is, it is difficult to see fluorescence detail in this case because the auto-exposure management is underexposing these elements (e.g., not giving a long enough exposure time, not providing enough auto-exposure gain, etc.). While not shown in FIG. 4, it will be understood that an opposite problem could also occur when the second image component is not independently accounted for. Specifically, for instance, a dilution of the fluorescence imaging agent may be relatively low and/or a time elapsed since the agent was introduced may be relatively high. In this example, elements 404 could be so bright as to be overexposed or completely saturated, thereby still limiting the detail that a user will be able to see in the image, albeit in a different way than shown in image frame 400-1. It will be understood that neither of these examples would be desirable.

Accordingly, as shown in image frame 400-2, the second image component including elements 404 is accounted for separately from the first image component including elements 402 such that elements 404 are properly exposed (e.g., neither underexposed nor overexposed) and can be seen with a desirable level of detail. FIGS. 5-10B will now be described to explain how the desirable results of image frame 400-2 may be obtained by novel auto-exposure management principles for multi-component images described herein.

Figure 5:
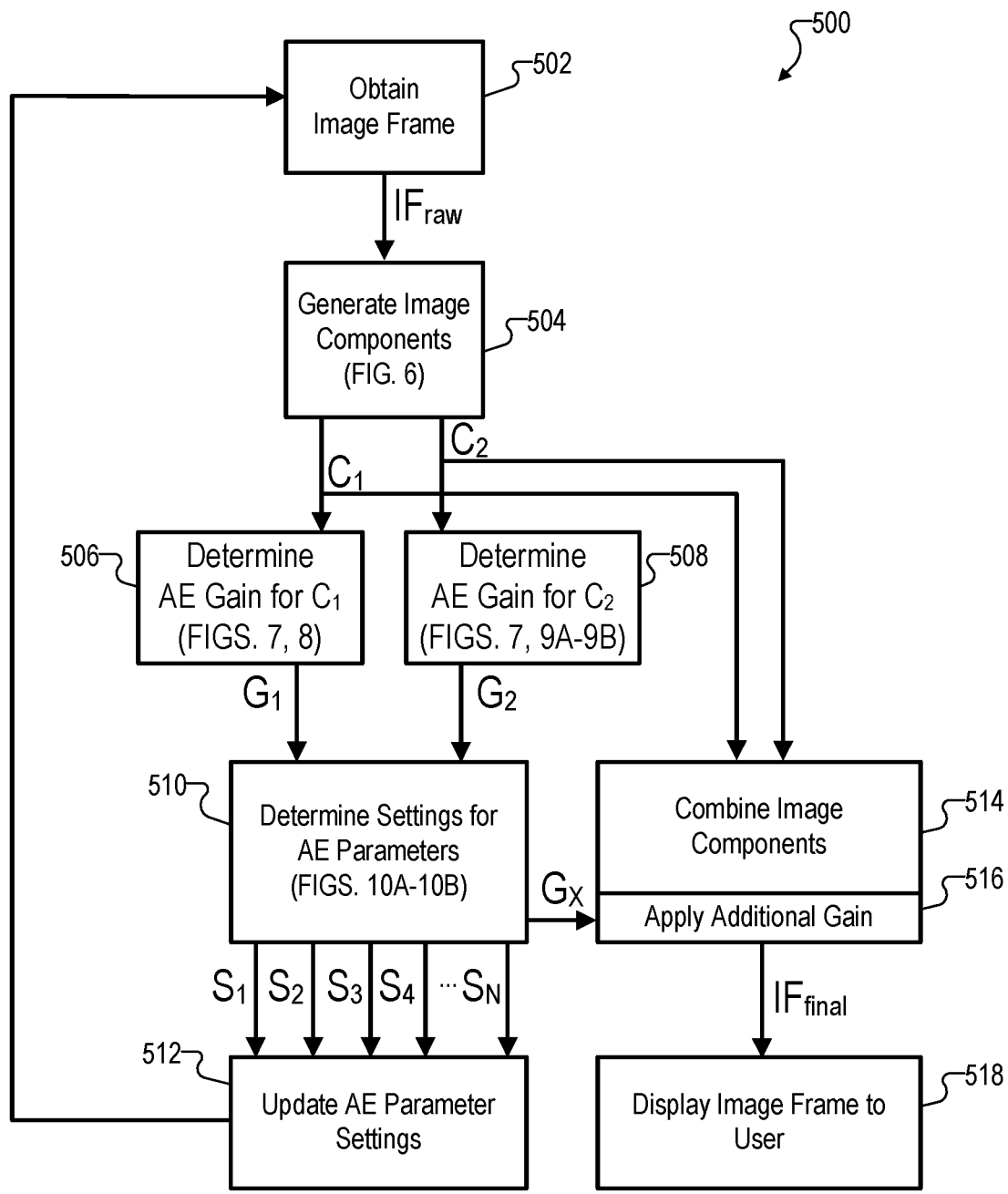
FIG. 5 shows an illustrative flow diagram for auto-exposure management of multi-component images in accordance with principles described herein.

FIG. 5 shows an illustrative flow diagram 500 for auto-exposure management of multi-component images using, for example, an implementation of apparatus 100, method 200, and/or system 300. As shown, flow diagram 500 illustrates various operations 502-518, which will each be described in more detail below. It will be understood that operations 502-518 represent one embodiment, and that other embodiments may omit, add to, reorder, and/or modify any of these operations. As will be described, various operations 502-518 of flow diagram 500 may be performed for one image frame or multiple image frames (e.g., each image frame in an image frame sequence). It will be understood that, depending on various conditions, not every operation might be performed for every image frame, and the combination and/or order of operations performed from frame to frame in the image frame sequence may vary. Operations 502-518 of flow diagram 500 will now be described in relation to FIG. 5 and with further reference to FIGS. 6-10B, as indicated in FIG. 5 for certain operations.

At operation 502, apparatus 100 may obtain an image frame. For example, as described above, the image frame may be captured by an image capture system (e.g., image capture system 302) in accordance with one or more auto-exposure parameters that are set to particular settings that may be reevaluated and adjusted based on the image frame in the ways described below. The image frame obtained at operation 502 may be a multi-component image frame that includes a visible light image component, a fluorescence or other image component associated with non-visible light, and/or any other image components as may serve a particular implementation. As shown, the multi-component image frame obtained at operation 502 is represented in FIG. 5 by a symbol $IF_{raw}$ to indicate an Image Frame (IF) that is not yet analyzed and processed (raw).

At operation 504, apparatus 100 may generate a plurality of image components based on the multi-component image frame $IF_{raw}$ obtained at operation 502. Specifically, apparatus 100 may generate a first image component (represented using symbol $C_1$ in FIG. 5) that is associated with visible light and a second image component (represented using symbol $C_2$ in FIG. 5) that is associated with non-visible light such as fluorescence excitation illumination emitted at a wavelength included in an infrared light region. In this example, the first image component $C_1$ associated with the visible light may depict image content illuminated by visible light, while the second image component $C_2$ associated with the non-visible light may depict fluorescence illumination emitted by a fluorescence imaging agent excited by the fluorescence excitation illumination. For example, referring back to FIG. 4, the first image component $C_1$ may depict only elements 402 while the second image component $C_2$ may depict only elements 404.

Figure 6:
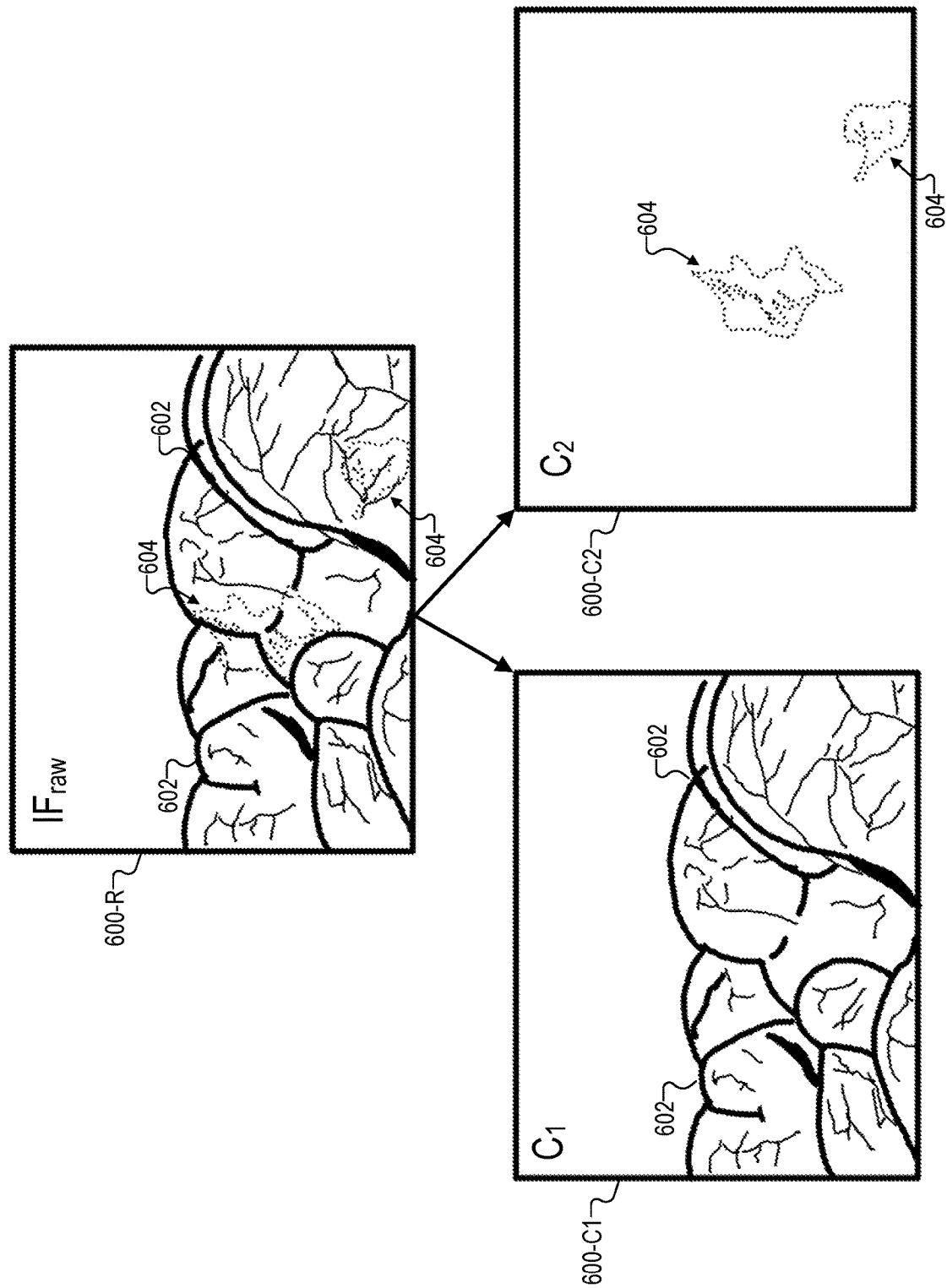
FIG. 6 shows an illustrative multi-component image frame and two image components included within the multi-component image frame in accordance with principles described herein.

To further illustrate the first and second image components $C_1$ and $C_2$, FIG. 6 shows an illustrative multi-component image frame 600-R and two image components 600-C1 and 600-C2 that are included within multi-component image frame 600-R. As shown, multi-component image frame 600-R may represent the image frame $IF_{raw}$ that is obtained at operation 502 and image components 600-C1 and 600-C2 may represent the image components C1 and C2 that are generated at operation 504. As such, image component 600-C1 is shown to depict only elements 602 that are illuminated by visible light (e.g., the same anatomical content described above in relation to elements 402) and image component 600-C2 is shown to depict only elements 604 that are fluorescing under the influence of non-visible light (e.g., the same fluorescence content described above in relation to elements 404). Apparatus 100 may generate image components 600-C1 and 600-C2 in any suitable manner. For example, apparatus 100 may use a channel decoupling matrix to separate the content of image component 600-C1 from the content of image component 600-C2. A 3×2 matrix or other suitable decoupling matrix may function to decouple the mixed signal of image frame 600-R to generate signals associated with image components 600-C1 and 600-C2.

Returning to FIG. 5, at operation 506, apparatus 100 may determine a first auto-exposure gain $G_1$ based on the first image component $C_1$ generated at operation 504. Similarly, at operation 508, apparatus 100 may determine a second auto-exposure gain $G_2$ based on the second image component $C_2$ generated at operation 504.

Operations 506 and 508 may be performed in any suitable manner based on the generated image components $C_1$ and $C_2$. As one example of how operation 506 may be performed, apparatus 100 may determine auto-exposure data points for the first image component $C_1$ and compute the first auto-exposure gain $G_1$ based on these auto-exposure data points. More specifically, apparatus 100 may access a first auto-exposure target for the first image component $C_1$, detect a first auto-exposure value for the first image component $C_1$, and determine the first auto-exposure gain $G_1$ based on the first auto-exposure target and the first auto-exposure value. Similarly, as an example of how operation 508 may be performed, apparatus 100 may determine auto-exposure data points for the second image component $C_2$ and compute the second auto-exposure gain $G_2$ based on these auto-exposure data points. More specifically, apparatus 100 may access a second auto-exposure target for the second image component $C_2$, detect a second auto-exposure value for the second image component $C_2$, and determine the second auto-exposure gain $G_2$ based on the second auto-exposure target and the second auto-exposure value.

Apparatus 100 may determine (e.g., access, detect, compute, etc.) the auto-exposure data points (e.g., the auto-exposure values, targets, gains, etc.) at operations 506 and 508 in any manner as may serve a particular implementation. For example, apparatus 100 may access the respective first and second auto-exposure targets by accessing data representative of respective first and second user-selected settings indicative of a user preference for luminance with which the respective first and second image components are to be presented (e.g., a first user preference indicating a desired luminance for the first image component and a second user preference indicating a desired luminance for the second image component). Such data may be stored with other user preference settings in memory 102 of apparatus 100, for example, or in another suitable storage location. Apparatus 100 may detect the respective first and second auto-exposure values by analyzing the luminance (and/or other relevant image characteristics) of pixels of the respective first and second image components $C_1$ and $C_2$, and then may determine the respective first and second auto-exposure gains $G_1$ by using different auto-exposure gain algorithms as may serve each respective image component. For instance, apparatus 100 may employ a first auto-exposure gain algorithm to determine the first auto-exposure gain $G_1$ for the first image component $C_1$ at operation 506, while employing a second auto-exposure algorithm (e.g., an algorithm that is different from the first auto-exposure gain algorithm) for determining the second auto-exposure gain $G_2$ for the second image component $C_2$ at operation 508.

As indicated at operations 506 and 508 in FIG. 5, FIGS. 7, 8, and 9A-9B illustrate various aspects of how operations 506 and 508 may be performed. These figures will now be described to better illustrate the respective determining of auto-exposure gains $G_1$ and $G_2$ at operations 506 and 508.

Figure 7:
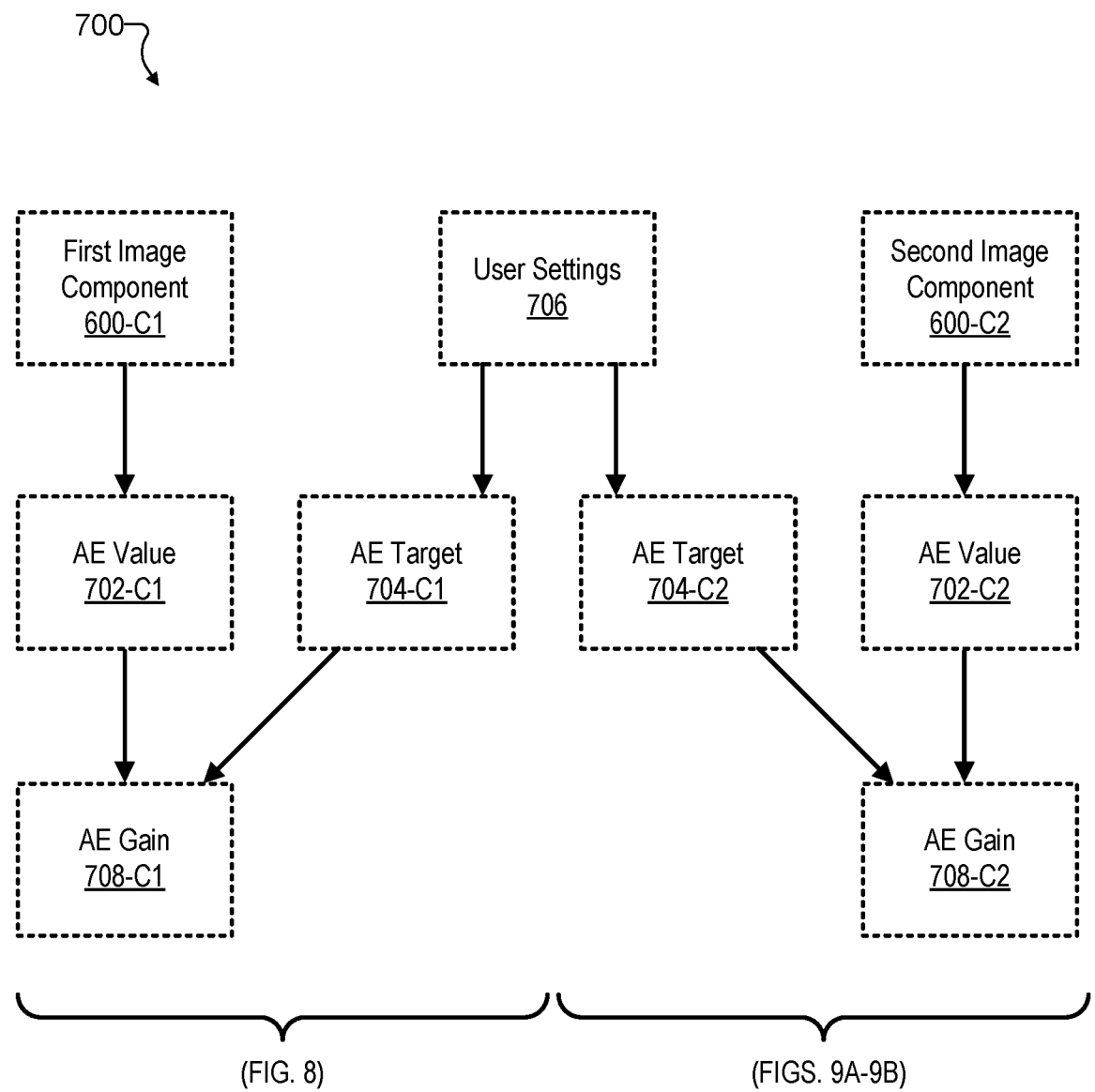
FIG. 7 shows an illustrative dataflow by way of which respective auto-exposure gains are determined for different image components of an image frame in accordance with principles described herein.

FIG. 7 shows an illustrative dataflow 700 by way of which respective auto-exposure gains are determined for image component 600-C1 (an implementation of the first image component $C_1$) and image component 600-C2 (an implementation of the second image component $C_2$) of multi-component image frame 600-R (an implementation of image frame $IF_{raw}$). In FIG. 7, as well as other flow diagram figures described herein, a notation is employed in which operations are depicted using solid lines while input or output data used or created by these operations are depicted using dotted lines. For example, as was shown in flow diagram 500 of FIG. 5, each of operations 502-518 was drawn using solid lines. In contrast, dataflow 700 of FIG. 7 is shown to include only data (represented using dotted lines) that will be understood to be used as a basis on which to generate other data as indicated by the arrows. Other figures described below will use a mixture of solid lines to indicate operations being performed as well as dotted lines to indicate input or output data of these operations as may be appropriate in a particular situation.

As shown in FIG. 7, first image component 600-C1 may be analyzed to detect an auto-exposure value 702-C1 and second image component 600-C2 may be analyzed to detect an auto-exposure value 702-C2. As described above, these auto-exposure values may serve as component auto-exposure values that represent respective luminance levels (or levels associated with other suitable image components) for the respective image components which may or may not currently be aligned with desired levels indicated by respective component auto-exposure targets represented by an auto-exposure target 704-C1 (for first image component 600-C1) and an auto-exposure target 704-C2 (for second image component 600-C2). As mentioned above, auto-exposure targets 704-C1 and 704-C2 may be determined based on user presences such as represented in FIG. 7 by user settings 706. For example, user settings 706 may be set to a default setting that may be adjusted by a user according to preference and stored so as to be accessed and used as the respective auto-exposure targets for the visible light elements of an image sequence (auto-exposure target 704-C1) and the non-visible light elements of the image sequence (auto-exposure target 704-C2).

An auto-exposure gain 708-C1 (e.g., an implementation of auto-exposure gain $G_1$) may be generated (e.g., computed, determined, etc.) based on auto-exposure value 702-C1 and auto-exposure target 704-C1. For example, auto-exposure gain 708-C1 may be determined as a ratio of auto-exposure target 704-C1 to auto-exposure value 702-C1 (the quotient when the target is divided by the value), by an inverse of this ratio, by a version of this ratio that is scaled by a constant, or the like. Similarly, an auto-exposure gain 708-C2 (e.g., an implementation of auto-exposure gain $G_2$) may be generated based on auto-exposure value 702-C2 and auto-exposure target 704-C2. For example, auto-exposure gain 708-C2 may be determined as a ratio of auto-exposure target 704-C2 to auto-exposure value 702-C2, by an inverse of this ratio, by a version of this ratio scaled by a constant, or in another suitable way as may be employed in a particular auto-exposure management algorithm used in a particular implementation.

Figure 8:
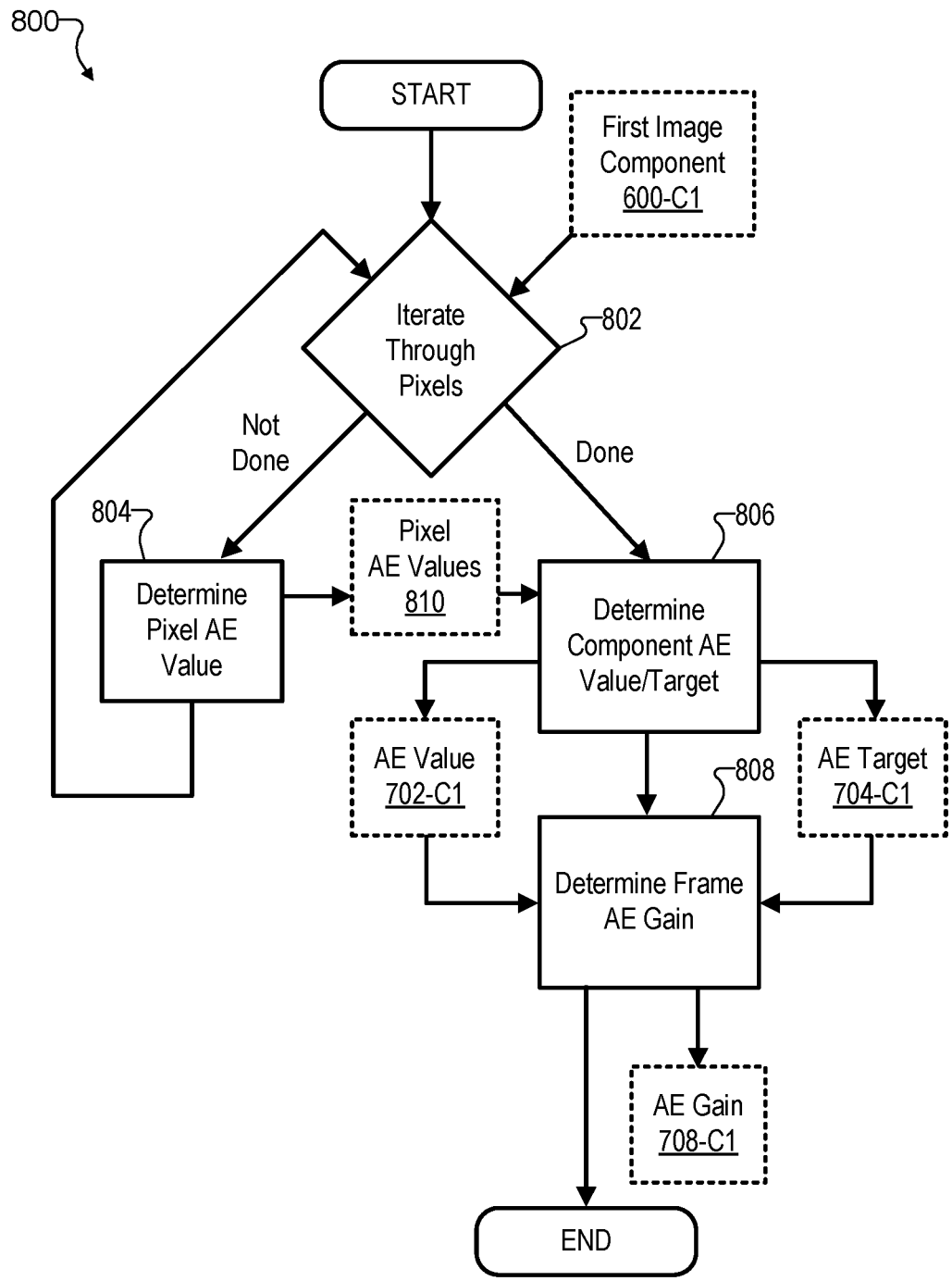
FIG. 8 shows an illustrative way of determining an auto-exposure gain for an image component associated with visible light in accordance with principles described herein.
Figure 9B:
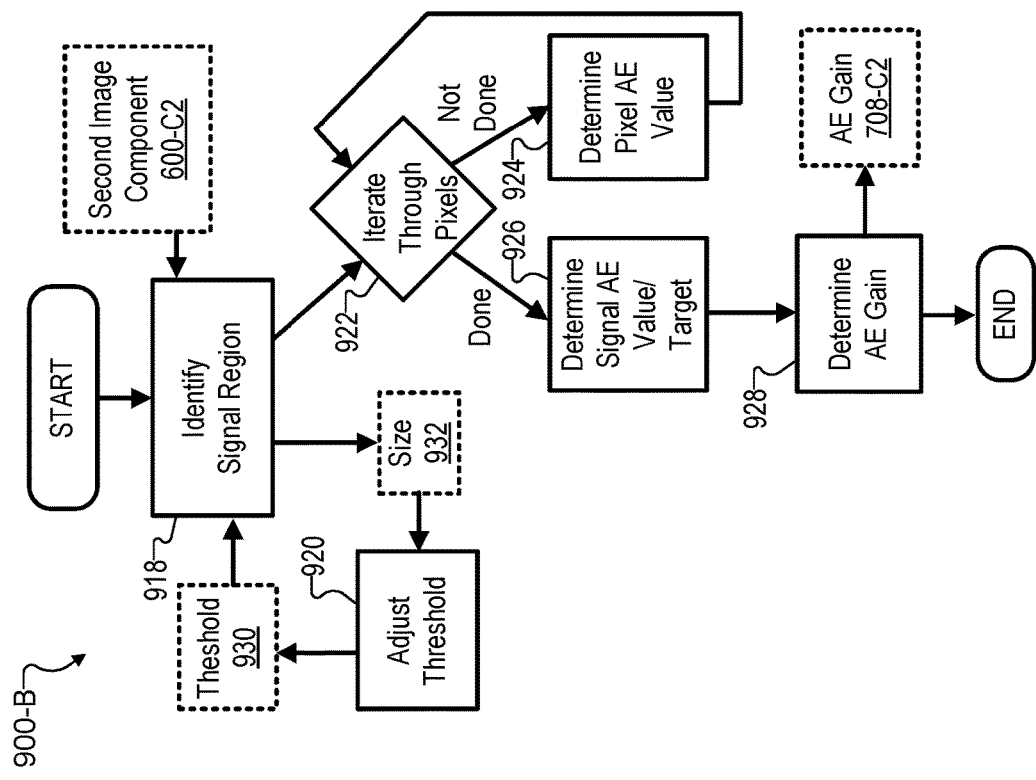
FIGS. 9A-9B show illustrative ways of determining an auto-exposure gain for an image component associated with non-visible light in accordance with principles described herein.
Figure 9A:
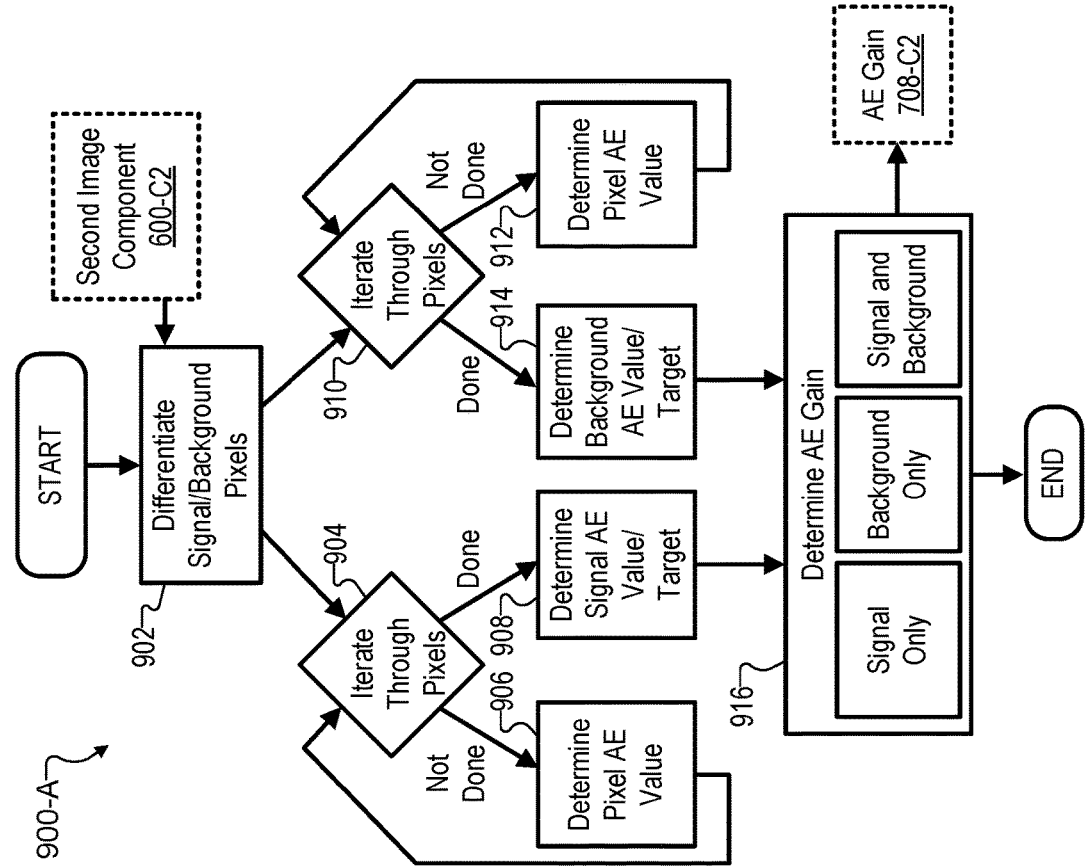

Brackets at the bottom of FIG. 7 show that further detail associated with the determination of auto-exposure gain 708-C1 is illustrated in FIG. 8, while further detail associated with the determination of auto-exposure gain 708-C2 is illustrated in FIGS. 9A-9B. Specifically, FIG. 8 illustrates a flow diagram 800 showing an illustrative way of determining auto-exposure gain 708-C1 for first image component 600-C1 associated with visible light, while FIGS. 9A and 9B illustrate respective flow diagrams 900-A and 900-B that show two illustrative ways of determining auto-exposure gain 708-C2 for second image component 600-C2 associated with non-visible light. The auto-exposure gain algorithms illustrated by FIGS. 8-9B will now be described.

FIG. 8 shows a plurality of operations 802-808 of flow diagram 800 that are included within a first auto-exposure gain algorithm that begins (at label START) when data for first image component 600-C1 is accessed and finishes (at label END) when auto-exposure gain 708-C1 is successfully determined. Starting at operation 802, the auto-exposure gain algorithm of flow diagram 800 may iterate through each pixel of an image component or portion of an image component (e.g., each cell or group of pixels in implementations that may operate on such groupings rather than on individual pixels). For each pixel (or pixel grouping), the algorithm determines a pixel auto-exposure value at operation 804, then moves onto the next pixel (or pixel grouping) to repeat the process (as long as the iterating of operation 802 is incomplete (Not Done)). These pixel auto-exposure values are shown to be output from operation 804 as pixel auto-exposure values 810. Once the iteration of operation 802 is complete (Done), such that all of pixel auto-exposure values 810 are determined, these pixel auto-exposure values 810 may be used at operation 806 to determine component auto-exposure value 702-C1. For example, auto-exposure value 702-C1 may be determined as an average (e.g., mean, median, mode, or other average such as described above) of all or a subset of pixel auto-exposure values 810. Also at operation 806, component auto-exposure target 704-C1 may be determined such as by being accessed from user settings 706 as described above in relation to FIG. 7 (user settings not explicitly shown in flow diagram 800 of FIG. 8). At operation 808, auto-exposure gain 708-C1 may be determined based on auto-exposure value 702-C1 and/or auto-exposure target 704-C1 in any of the ways described herein (e.g., as the ratio of the target to the value, etc.).

FIG. 9A shows a plurality of operations 902-916 of flow diagram 900-A that are included within one example of an auto-exposure gain algorithm that may be employed to determine auto-exposure gain 708-C2 for an image component associated with non-visible light (e.g., a fluorescence image component such as image component 600-C2 illustrated in FIG. 6). As shown, the algorithm of flow diagram 900-A is different from the algorithm of flow diagram 800 that was described above as being an illustrative way of determining auto-exposure gain 708-C1 for an image component associated with visible light.

As shown, flow diagram 900-A begins (at label START) when data for second image component 600-C2 is accessed and finishes (at label END) when auto-exposure gain 708-C2 is successfully determined. It will be understood that intermediate auto-exposure data points (e.g., auto-exposure values, auto-exposure targets, etc.) may be determined by operations of flow diagram 900-A, even if these auto-exposure data points are not explicitly shown in FIG. 9A due to space constraints in the figure.

Starting at operation 902, the auto-exposure gain algorithm of flow diagram 900-A differentiates (within the set of pixels of second image component 600-C2) signal pixels of second image component 600-C2 from background pixels of second image component 600-C2. For example, signal pixels may include those pixels that depict fluorescence content at a luminance that satisfies a particular threshold while background pixels may include those pixels that fail to do so (e.g., dark pixels corresponding to content of the scene that is not fluorescing). The auto-exposure gain algorithm may then determine one or more of a signal auto-exposure value for the signal pixels or a background auto-exposure value for the background pixels. For instance, in one implementation, the auto-exposure gain algorithm may separately determine the signal auto-exposure value for the signal pixels and the background auto-exposure value for the background pixels in a manner similar to that used in the auto-exposure gain algorithm of flow diagram 800 for the entire first image component.

Specifically, as shown, at operation 904, the algorithm may iterate through all the signal pixels differentiated in operation 902 and, as long as the iteration is incomplete (Not Done), may determine pixel auto-exposure values for each signal pixel (or grouping of pixels) at operation 906. When all signal pixels have been iterated through at operation 904 (Done), the algorithm may proceed to operation 908 to determine a signal auto-exposure value based on the pixel auto-exposure values determined at operation 906. A signal auto-exposure target may also be determined (e.g., accessed, etc.) at operation 908. Similarly, for the background pixels differentiated at operation 902, the algorithm, at operation 910, may iterate through all the background pixels differentiated in operation 902 and, as long as the iteration is incomplete (Not Done), may determine pixel auto-exposure values for each background pixel (or grouping of pixels) at operation 912. When all background pixels have been iterated through at operation 910 (Done), the algorithm may proceed to operation 914 to determine a background auto-exposure value based on the pixel auto-exposure values determined at operation 912. A background auto-exposure target may also be determined (e.g., accessed, etc.) at operation 914.

With a signal auto-exposure value and target determined (at operation 908) and a background auto-exposure value and target determined (at operation 914), the auto-exposure gain algorithm of flow diagram 900-A may proceed to an operation 916, where these auto-exposure data points are used to determine auto-exposure gain 708-C2. Specifically, at operation 916, apparatus 100 may determine auto-exposure gain 708-C2 based on one or more (e.g., either or both) of the signal auto-exposure value or the background auto-exposure value and the corresponding auto-exposure targets. For example, as shown, in certain scenarios (e.g., when a size of a signal region associated with the signal pixels meets a first particular threshold), auto-exposure gain 708-C2 may be determined exclusively based on the signal auto-exposure value and auto-exposure target (SIgnal Only). In other scenarios (e.g., when the size of the signal region associated with the signal pixels fails to meet a second threshold lower than the first threshold), auto-exposure gain 708-C2 may be determined exclusively based on the background auto-exposure value and auto-exposure target (Background Only). In still other scenarios (e.g., when the size of the signal region satisfies the second threshold but fails to satisfy the first threshold), auto-exposure gain 708-C2 may be determined based on the signal and background auto-exposure values and targets (SIgnal and Background). In all of these scenarios, operation 916 may involve computing auto-exposure gain 708-C2 based on a ratio of the relevant auto-exposure target (or average of both targets) to the relevant auto-exposure value (or average of both values) in ways similar to those described elsewhere in this disclosure.

FIG. 9B shows a plurality of operations 918-928 of flow diagram 900-B that are included within another example of an auto-exposure gain algorithm that may be employed to determine auto-exposure gain 708-C2 for an image component associated with non-visible light (e.g., a fluorescence image such as image component 600-C2 illustrated in FIG. 6). As shown, the algorithm of flow diagram 900-B is different from the algorithm of flow diagram 800 that was described above as being an illustrative way of determining auto-exposure gain 708-C1 for an image component associated with visible light. The algorithm of flow diagram 900-B is also different from the algorithm of flow diagram 900-A, though it will be understood that both of these auto-exposure gain algorithms aim to accomplish the same or a similar objective (e.g., to determine auto-exposure gain 708-C2) and may represent alternative ways of doing do. In certain examples, rather than these auto-exposure gain algorithms strictly being alternatives, an implementation may implement an algorithm that incorporates both algorithms (or certain elements of each) into a single auto-exposure gain algorithm for determining auto-exposure gain 708-C2.

Similar to flow diagram 900-A, flow diagram 900-B is shown to begin (at label START) when data for second image component 600-C2 is accessed and to finish (at label END) when auto-exposure gain 708-C2 is successfully determined. It will be understood that intermediate auto-exposure data points (e.g., auto-exposure values, auto-exposure targets, etc.) may be determined by operations of flow diagram 900-B, even if these auto-exposure data points are not explicitly shown in FIG. 9B due to space constraints in the figure.

At operation 918, the auto-exposure gain algorithm of flow diagram 900-B identifies (within second image component 600-C2) a signal region including pixels having auto-exposure values exceeding an auto-exposure value threshold 930, which, as shown, may be received as input to operation 918. This identified group of signal pixels will be referred to as a signal region that has a particular size 932, which, as shown, may be determined as output by operation 918. Pixels determined to be included within the signal region may include those pixels that depict fluorescence content at a luminance that satisfies auto-exposure value threshold 930 while pixels excluded from the signal region may include those pixels depicting fluorescence that fails to satisfy the threshold (e.g., pixels that depict content of the scene that is not fluorescing). At operation 920, the auto-exposure value threshold 930 may be adjusted based on size 932 of the signal region to thereby form a feedback loop with operation 918. Specifically, using this feedback loop mechanism, auto-exposure value threshold 930 may be adjusted in a manner that targets maintaining size 932 of the signal region at or above a predetermined signal region size threshold (not represented in FIG. 9B). For example, operation 920 may involve adjustments aimed at keeping size 932 of the signal region above a particular percentage (e.g., 1%, 10%, etc.) of the overall image component 600-C2 even if that means interpreting noise to be signal when the signal is weak. In this way, the algorithm may ensure that even very weak signal pixels (e.g., signal pixels on par with noise levels) may be interpreted as being part of the signal region such that they may be accounted for by the auto-exposure gain algorithm.

The auto-exposure gain algorithm may then separately determine a signal auto-exposure value for the signal pixels in a manner similar to that used in other auto-exposure gain algorithms described above. Specifically, as shown, at an operation 922, the signal pixels may be iterated through such that, until each has been processed (Not Done), an operation 924 may involve determining pixel auto-exposure values for each of these signal pixels. After all signal pixels have been iterated through at operation 922 (Done), an operation 926 may involve determining a signal auto-exposure value based on (e.g., as an average of, etc.) the pixel auto-exposure values determined at operation 924. An auto-exposure target for the signal region may also be determined (e.g., accessed, etc.) at this stage. At operation 928, apparatus 100 may then determine auto-exposure gain 708-C2 based on the auto-exposure value and auto-exposure target for the signal region determined at operation 926.

Returning to FIG. 5, at operation 510, apparatus 100 may determine one or more settings for one or more auto-exposure parameters based on the auto-exposure gains $G_1$ and $G_2$ (e.g., auto-exposure gains 708-C1 and 708-C2 derived in the ways described above). As shown, a plurality of N different settings may be determined at operation 510 in this example, and each setting may be represented by a symbol $S_1$ (for the $1^{st}$ parameter setting) $S_2$, $S_3$, and so forth up to $S_N$ (for the $N^{th}$ parameter setting). Each of the auto-exposure parameter settings represented by $S_1$-$S_N$ may be associated with a different one of the auto-exposure parameters employed by a particular image capture system in a particular implementation. For example, as described above in relation to image capture system 302, these auto-exposure parameters may include an exposure time parameter, an illumination intensity parameter for a visible light source, an illumination intensity parameter for a non-visible light source, various gain parameters (e.g., an analog gain parameter, an RGB gain parameter, a Bayer gain parameter, etc.), and/or any other auto-exposure parameter described herein or as may serve a particular implementation. As will be described in more detail below, operation 510 may also involve determining an extra amount of gain (represented in FIG. 5 with symbol $G_x$) that may be extra gain that is to be applied in connection with combining image components $C_1$ and $C_2$ in the event that both image components are not adequately accounted for by auto-exposure parameter settings alone.

To illustrate how operation 510 may be performed, FIGS. 10A and 10B show illustrative ways that apparatus 100 may determine settings for different types of auto-exposure parameters based on auto-exposure gains $G_1$ and $G_2$ for image components $C_1$ and $C_2$. More particularly, in the example of FIG. 10A, a setting for one particular auto-exposure parameter designated by the letter "I" is illustrated, while, in the example of FIG. 10B, a setting for a different auto-exposure parameter designated by the letter "J" is illustrated. Auto-exposure parameters I and J will each be understood to represent any suitable auto-exposure parameter such as any of the auto-exposure parameters described herein. However, it will be understood that, in the description of FIGS. 10A and 10B, there is at least one difference between auto-exposure parameter I and auto-exposure parameter J. That difference is that auto-exposure parameter I will be understood to be a non-shared auto-exposure parameter configured to be set with a dual setting that independently influences the first image component $C_1$ (associated with the visible light) and the second image component $C_2$ (associated with the non-visible light). In contrast, auto-exposure parameter J will be understood to be a shared auto-exposure parameter configured to be set with a single setting that influences both the first image component $C_1$ (associated with the visible light) and the second image component $C_2$ (associated with the non-visible light).

As used herein, a non-shared auto-exposure parameter refers to an auto-exposure parameter that can be set in a manner that distinguishes the effect of the parameter on a first image component from the effect of the parameter on a second image component. For example, in certain implementations such as some of the fluorescence imaging examples described herein, an illumination intensity parameter may be an example of a non-shared auto-exposure parameter because the illumination intensity of the visible light illumination source (e.g., visible light illumination source 304-1 of image capture system 302 in FIG. 3) may be set independently from the illumination intensity of the non-visible light illumination source (e.g., non-visible light illumination source 304-2 of image capture system 302 in FIG. 3). In this example, a dual setting for the non-shared illumination intensity parameter may indicate two independent settings-one for the visible light illumination source and another for the non-visible light illumination source.

In contrast, a shared auto-exposure parameter, as used herein, refers to an auto-exposure parameter that does not distinguish between first and second image components in its effects. That is, the shared auto-exposure parameter can take only one setting that will affect both the first and second image components. Referring again to fluorescence implementations described herein, one example of a shared auto-exposure parameter may be an exposure time parameter corresponding to how long shutter 308 of image capture device 306 remains open when capturing an image frame. In this example, there are not separate shutters to allows in light associated with the first image component and light associated with the second image component. Rather, a single shutter 308 opens to expose image sensor 310 to both visible light content and non-visible light content (e.g., visible fluorescence content, etc.) for whatever time the exposure time parameter setting designates.

FIG. 10A shows aspects of an operation 510-1 in which a dual setting $S_I$ for auto-exposure parameter I is determined. Specifically, as shown, operation 510-1 includes an operation 1002-1 in which a first tentative parameter setting for auto-exposure parameter I is determined based on gain $G_1$. The first tentative parameter setting will be understood to be associated with first image component $C_1$ and is shown to be represented by a symbol $S_{I\_T1}$ (I for auto-exposure parameter I and T1 for being a Tentative parameter setting for the $1^{st}$ image component). Setting $S_{I\_T1}$ will be understood to represent a desired (e.g., optimal, ideal, etc.) setting for auto-exposure parameter I based exclusively on auto-exposure gain $G_1$ and not auto-exposure gain $G_2$ (e.g., the desired setting if only image component $C_1$, and not image component $C_2$, is accounted for). Operation 510-1 also includes an operation 1002-2 in which a second tentative parameter setting for auto-exposure parameter I is determined based on gain $G_2$. For similar reasons as described above for $S_{I\_T1}$, the tentative parameter setting determined at operation 1002-2 is represented in FIG. 10A by a symbol $S_{I\_T2}$. Setting $S_{I\_T2}$ will be understood to represent a desired setting for auto-exposure parameter I based exclusively on auto-exposure gain $G_2$ and not auto-exposure gain $G_1$.

At operation 1004, apparatus 100 may determine dual auto-exposure parameter setting 1006 by merging the $S_{I\_T1}$ and $S_{I\_T2}$ tentative parameter settings. Dual auto-exposure parameter setting 1006 is shown in FIG. 10A to include two parts-one that is associated with a setting represented by symbol $S_{I\_1}$ and another associated with a setting represented by symbol $S_{I\_2}$. Because auto-exposure parameter setting 1006 is a dual auto-exposure parameter setting, operation 1004 may, in certain examples, pass through each of the tentative parameter settings to generate the dual parameter setting. For example, $S_{I\_T1}$ may be passed through to equal $S_{I\_1}$ and $S_{I\_T2}$ may be passed through to equal $S_{I\_2}$. If auto-exposure parameter I is an illumination intensity parameter, for example, $S_{I\_T1}$ and $S_{I\_1}$ may both represent a desired intensity (based on auto-exposure gain $G_1$) for the visible light illumination source, while $S_{I\_T2}$ and $S_{I\_2}$ may both represent a desired intensity (based on auto-exposure gain $G_2$) for the non-visible light illumination source. Because, in certain implementations, operation 1004 may have to account for other auto-exposure parameter settings in a particular order of priority (as will be described in more detail below), it may also be the case that operation 1004 determines the dual setting for auto-exposure parameter I to be something other than the tentative parameter settings (e.g., such that $S_{I\_T1}$ does not necessarily equal $S_{I\_1}$ and/or $S_{I\_T2}$ does not necessarily equal to $S_{I\_2}$).

FIG. 10B shows aspects of an operation 510-J in which a single setting $S_J$ for an auto-exposure parameter J is determined. Similar to operations 1002-1 and 1002-2 in FIG. 10A, operation 510-J includes an operation 1008-1 in which a first tentative parameter setting for auto-exposure parameter J is determined based on gain $G_1$ and an operation 1008-2 in which a second tentative parameter setting for auto-exposure parameter J is determined based on gain $G_2$. The first tentative parameter setting will be understood to be associated with first image component $C_1$ and is shown to be represented by a symbol $S_{J\_T1}$. Setting $S_{J\_T1}$ will be understood to represent a desired setting for auto-exposure parameter J based exclusively on auto-exposure gain $G_1$ and not auto-exposure gain $G_2$ (e.g., the desired setting if only image component $C_1$, and not image component $C_2$, is accounted for). The second tentative parameter setting determined at operation 1008-2 is represented in FIG. 10B by a symbol $S_{J\_T2}$ and will be understood to represent a desired setting for auto-exposure parameter J based exclusively on auto-exposure gain $G_2$ and not auto-exposure gain $G_1$.

At operation 1010, apparatus 100 may determine a single auto-exposure parameter setting 1012 by merging the $S_{J\_T1}$ and $S_{J\_T2}$ tentative parameter settings. Unlike dual auto-exposure parameter setting 1006, single auto-exposure parameter setting 1012 is shown in FIG. 10B to include just one setting represented by symbol $S_J$. As such, a strategic approach may be taken at operation 1010 to determine how to merge the two tentative parameter settings into the single, shared parameter setting 1012, since passing through each of the tentative parameter settings in not an option if the tentative parameter settings are different. For example, if auto-exposure parameter J is an exposure time parameter, setting $S_{J\_T1}$ may be a setting of $\frac{1}{60}$th second while setting $S_{J\_T2}$ may be a setting of $\frac{1}{30}$th second (e.g., twice as much time as $S_{J\_T1}$). If the merging at operation 1010 splits the difference between these tentative parameters and determines setting $S_J$ to be $\frac{1}{45}$th second, that might be acceptable (though not optimal) for the second image component as the under exposure may be compensated for by other auto-exposure parameters such as parameters associated with adding more gain, adding more fluorescence illumination intensity, or the like. However, for the first image component, a setting $S_J$ of $\frac{1}{45}$th second may cause future image frames to be overexposed (e.g., saturated), which may be more difficult to compensate for with other auto-exposure parameters such as gain. Accordingly, strategically merging the tentative parameter settings at operation 1010 may involve accounting for these types of issues and, in this example, $S_J$ may be set to $\frac{1}{60}$th second (e.g., rather than $\frac{1}{45}$th second or another intermediate value) because that may be the maximum exposure time that will not overexpose the first image component. In this example, other auto-exposure parameters or extra gain may be added to achieve the desired gain $G_2$ of the second image component.

Returning to FIG. 5, the auto-exposure parameters for which settings are determined at operation 510 are included in a set of auto-exposure parameters used by an image capture system to capture a series of image frames including the image frame $IF_{raw}$ and subsequent image frames. As such, operation 510 shows that there may be various auto-exposure parameter settings $S_1$-$S_N$ that may be determined based on auto-exposure gains $G_1$ and $G_2$. As has been described, certain of these settings may be non-shared settings for non-shared auto-exposure parameters (see FIG. 10A) while others may be shared settings for shared auto-exposure parameters (see FIG. 10B). In any case, it will be understood that it may be a combination of multiple parameter settings (rather than a single auto-exposure parameter setting) that ultimately allows the image capture system to achieve the targeted auto-exposure gains $G_1$ and $G_2$ for subsequent image frames. As such, there may be different combinations of settings that could help achieve the same gains, and one aspect of operation 510 may be prioritizing how different auto-exposure parameters are to be set so as to not only achieve the desired gains but to do so in a desirable or optimized way. To this end, apparatus 100 may determine updated settings for each auto-exposure parameter in the set of auto-exposure parameters based not only on the first and second auto-exposure gains $G_1$ and $G_2$, but also based on a predetermined order.

The predetermined order in which the settings are prioritized may not necessarily affect the ultimate auto-exposure gains that are achieved but may affect the quality of the subsequent image frames that are captured. Accordingly, the predetermined order may be configured to maximize a signal integrity for the subsequent image frames, to minimize a noise level captured for the subsequent image frames, and/or to otherwise optimize a quality of the subsequent image frames (all while still ensuring that the proper auto-exposure gains are achieved). As one example, an exposure time parameter corresponding to how long a shutter exposes an image sensor of the image capture system may come earlier in the predetermined order than a gain parameter (e.g., a parameter corresponding to an analog gain of the image capture system, an RGB gain of the image capture system, a Bayer gain of the image capture system, etc.). This is because more information may be obtained by exposing the image sensor for as long as possible (without overexposing either image component) and an appropriate amount of gain can be added subsequently. In certain examples, the predetermined order in which auto-exposure parameters are prioritized may go as follows: an exposure time parameter, an illumination intensity parameter, an analog gain parameter, an RGB gain parameter, and a Bayer gain parameter. Additional auto-exposure parameters may also be included in this order in certain implementations.

If either image component has an auto-exposure gain that is not satisfied by auto-exposure parameter in this predetermined order, an appropriate amount of additional gain may be applied directly to the image component at operation 516. As will be described in more detail below, the symbol for this extra gain in FIG. 5 is $G_x$.

At operation 512, apparatus 100 may update the auto-exposure parameters to the new settings $S_1$-$S_N$ determined at operation 510 such that subsequent image frames will be captured in accordance with the auto-exposure parameters set to the updated settings. At this point, auto-exposure management for the current image frame $IF_{raw}$ may be considered to be complete and flow may return to operation 502, where a subsequent image frame of the image frame sequence may be obtained to repeat the process. It will be understood that, in certain examples, every image frame may be analyzed in accordance with flow diagram 500 to keep the auto-exposure data points and parameters as up-to-date as possible. In other examples, only certain image frames (e.g., every other image frame, every third image frame, etc.) may be so analyzed to conserve processing bandwidth in scenarios where more periodic auto-exposure processing still allows design specifications and targets to be achieved. It will also be understood that auto-exposure effects may tend to lag a few frames behind luminance changes at a scene, since auto-exposure parameter adjustments made based on one particular frame do not affect the exposure of that frame, but rather affect subsequent frames. Based on updates to the auto-exposure parameters (and/or based on maintaining the auto-exposure parameters at their current levels when appropriate), apparatus 100 may successfully manage auto-exposure for image frames being captured by the image capture system, and subsequent image frames may be captured with desirable auto-exposure properties so as to have an attractive and beneficial appearance when presented to users.

Operations 514-518 are shown to occur alongside operations 510 and 512 that have been described. While operations 510 and 512 directly relate to auto-exposure management of the image frames, operations 514-518 relate to preparing and presenting the current frame (which was already captured using whatever auto-exposure parameters settings existed at the time of capture).

At operation 514, the first and second image components $C_1$ and $C_2$ that were generated at operation 504 based on the image frame $IF_{raw}$ as captured by the image capture system are combined (e.g., recombined) to form an output image frame (shown using symbol $IF_{final}$ in FIG. 5). More specifically, apparatus 100 may generate output image frame $IF_{final}$ to be configured for display to a user by combining the first image component $C_1$ and the second image component $C_2$.

As part of the combining of the image components, operation 516 shows that additional gain $G_x$ may be applied to either the first or second image components, or different gains may be applied to both. As mentioned above, this additional gain may help compensate for gain that apparatus 100 is not able to achieve by way of auto-exposure parameter settings alone (e.g., due to constraints on auto-exposure parameter settings that are shared between the two image components, etc.). At operation 516, the generating of the output image frame $IF_{final}$ may thus include applying, to at least one of the image components (e.g., the second image component $C_2$) prior to the combining of the first and second image components, an output gain that is not applied to the other image component (e.g., the first image component $C_1$).

At operation 518, the output image frame $IF_{final}$ may be provided to an output display for presentation to a user. For example, the output image frame $IF_{final}$ may be displayed to a surgeon or other user who will benefit from seeing both the visible light content and the fluorescence content at levels of luminance and other characteristics that make the images attractive and easy to see and understand as a result of the auto-exposure management that has been performed.

As has been described, apparatus 100, method 200, and/or system 300 may each be associated in certain examples with a computer-assisted medical system used to perform a medical procedure (e.g., a fluorescence-guided medical procedure) on a body. To illustrate, FIG. 11 shows an illustrative computer-assisted medical system 1100 that may be used to perform various types of medical procedures including surgical and/or non-surgical procedures.

Figure 11:
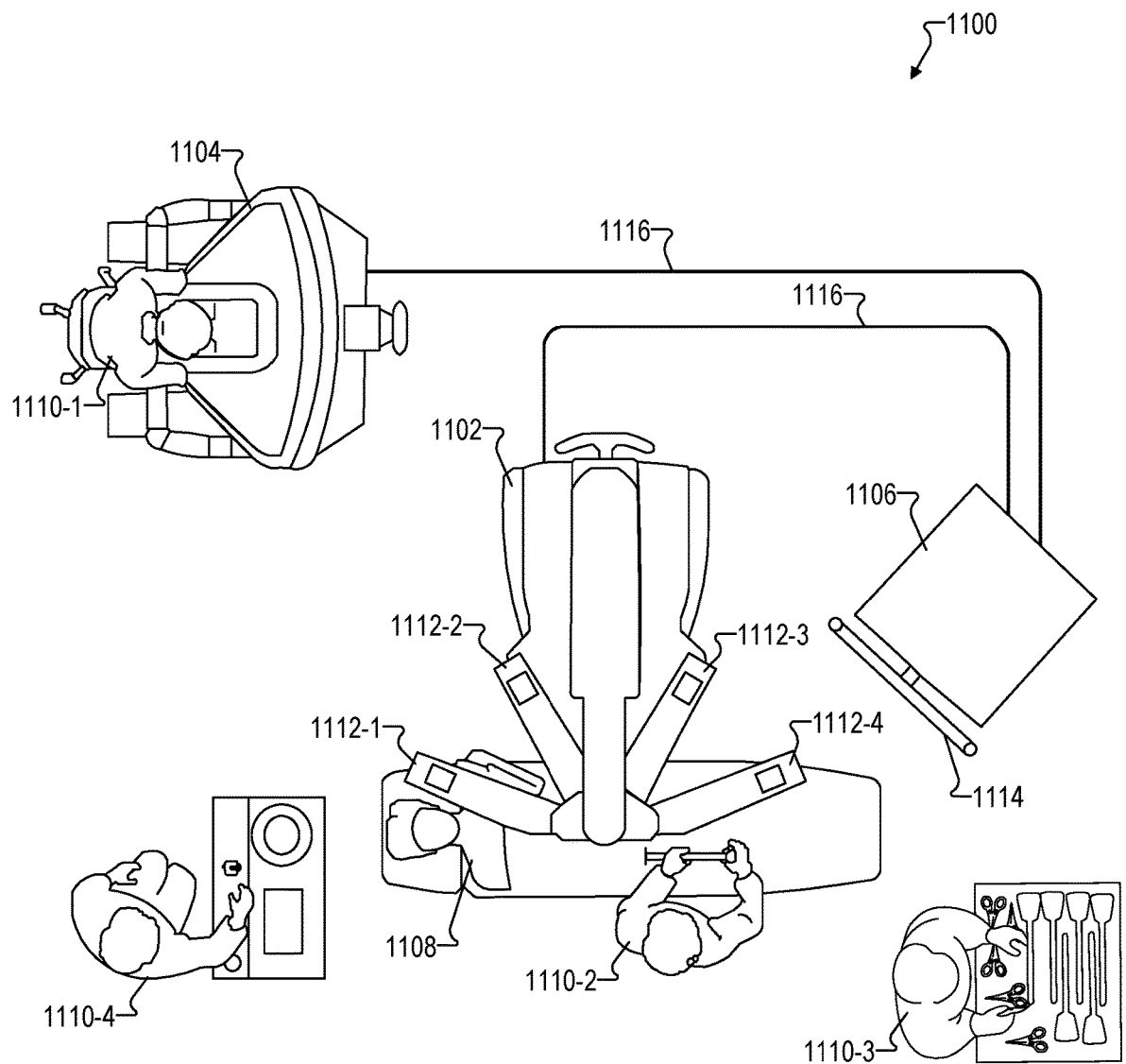
FIG. 11 shows an illustrative computer-assisted medical system according to principles described herein.

As shown, computer-assisted medical system 1100 may include a manipulator assembly 1102 (a manipulator cart is shown in FIG. 11), a user control apparatus 1104, and an auxiliary apparatus 1106, all of which are communicatively coupled to each other. Computer-assisted medical system 1100 may be utilized by a medical team to perform a computer-assisted medical procedure or other similar operation on a body of a patient 1108 or on any other body as may serve a particular implementation. As shown, the medical team may include a first user 1110-1 (such as a surgeon for a surgical procedure), a second user 1110-2 (such as a patient-side assistant), a third user 1110-3 (such as another assistant, a nurse, a trainee, etc.), and a fourth user 1110-4 (such as an anesthesiologist for a surgical procedure), all of whom may be collectively referred to as users 1110, and each of whom may control, interact with, or otherwise be a user of computer-assisted medical system 1100. More, fewer, or alternative users may be present during a medical procedure as may serve a particular implementation. For example, team composition for different medical procedures, or for non-medical procedures, may differ and include users with different roles.

While FIG. 11 illustrates an ongoing minimally invasive medical procedure such as a minimally invasive surgical procedure, it will be understood that computer-assisted medical system 1100 may similarly be used to perform open medical procedures or other types of operations. For example, operations such as exploratory imaging operations, mock medical procedures used for training purposes, and/or other operations may also be performed.

As shown in FIG. 11, manipulator assembly 1102 may include one or more manipulator arms 1112 (e.g., manipulator arms 1112-1 through 1112-4) to which one or more instruments may be coupled. The instruments may be used for a computer-assisted medical procedure on patient 1108 (e.g., in a surgical example, by being at least partially inserted into patient 1108 and manipulated within patient 1108). While manipulator assembly 1102 is depicted and described herein as including four manipulator arms 1112, it will be recognized that manipulator assembly 1102 may include a single manipulator arm 1112 or any other number of manipulator arms as may serve a particular implementation. While the example of FIG. 11 illustrates manipulator arms 1112 as being robotic manipulator arms, it will be understood that, in some examples, one or more instruments may be partially or entirely manually controlled, such as by being handheld and controlled manually by a person. For instance, these partially or entirely manually controlled instruments may be used in conjunction with, or as an alternative to, computer-assisted instrumentation that is coupled to manipulator arms 1112 shown in FIG. 11.

During the medical operation, user control apparatus 1104 may be configured to facilitate teleoperational control by user 1110-1 of manipulator arms 1112 and instruments attached to manipulator arms 1112. To this end, user control apparatus 1104 may provide user 1110-1 with imagery of an operational area associated with patient 1108 as captured by an imaging device. To facilitate control of instruments, user control apparatus 1104 may include a set of master controls. These master controls may be manipulated by user 1110-1 to control movement of the manipulator arms 1112 or any instruments coupled to manipulator arms 1112.

Auxiliary apparatus 1106 may include one or more computing devices configured to perform auxiliary functions in support of the medical procedure, such as providing insufflation, electrocautery energy, illumination or other energy for imaging devices, image processing, or coordinating components of computer-assisted medical system 1100. In some examples, auxiliary apparatus 1106 may be configured with a display monitor 1114 configured to display one or more user interfaces, or graphical or textual information in support of the medical procedure. In some instances, display monitor 1114 may be implemented by a touchscreen display and provide user input functionality. Augmented content provided by a region-based augmentation system may be similar, or differ from, content associated with display monitor 1114 or one or more display devices in the operation area (not shown).

As will be described in more detail below, apparatus 100 may be implemented within or may operate in conjunction with computer-assisted medical system 1100. For instance, in certain implementations, apparatus 100 may be implemented by computing resources included within an instrument (e.g., an endoscopic or other imaging instrument) attached to one of manipulator arms 1112, or by computing resources associated with manipulator assembly 1102, user control apparatus 1104, auxiliary apparatus 1106, or another system component not explicitly shown in FIG. 11.

Manipulator assembly 1102, user control apparatus 1104, and auxiliary apparatus 1106 may be communicatively coupled one to another in any suitable manner. For example, as shown in FIG. 11, manipulator assembly 1102, user control apparatus 1104, and auxiliary apparatus 1106 may be communicatively coupled by way of control lines 1116, which may represent any wired or wireless communication link as may serve a particular implementation. To this end, manipulator assembly 1102, user control apparatus 1104, and auxiliary apparatus 1106 may each include one or more wired or wireless communication interfaces, such as one or more local area network interfaces, Wi-Fi network interfaces, cellular interfaces, and so forth.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 12:
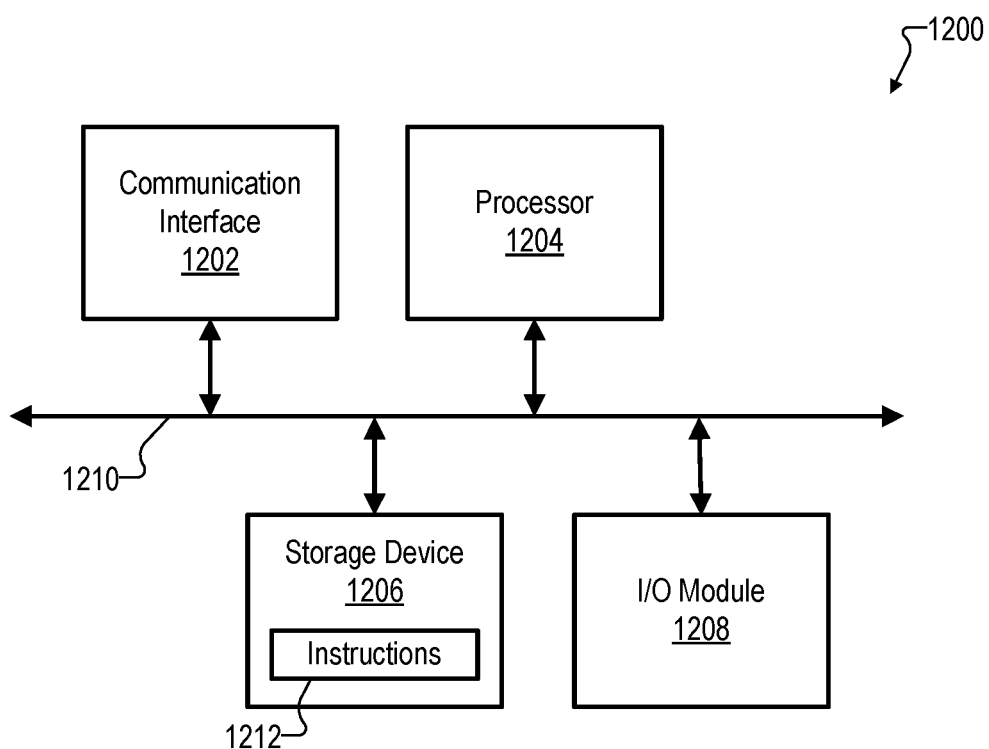
FIG. 12 shows an illustrative computing system according to principles described herein.

FIG. 12 shows an illustrative computing system 1200 that may be specifically configured to perform one or more of the processes described herein. For example, computing system 1200 may include or implement (or partially implement) an auto-exposure management apparatus such as apparatus 100, an auto-exposure management system such as system 300, or any other computing systems or devices described herein.

As shown in FIG. 12, computing system 1200 may include a communication interface 1202, a processor 1204, a storage device 1206, and an input/output (I/O) module 1208 communicatively connected via a communication infrastructure 1210. While an illustrative computing system 1200 is shown in FIG. 12, the components illustrated in FIG. 12 are not intended to be limiting. Additional or alternative components may be used in other embodiments. Components of computing system 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 1200. For example, one or more applications 1212 residing within storage device 1206 may be configured to direct processor 1204 to perform one or more processes or functions associated with processor 104 of apparatus 100. Likewise, memory 102 of apparatus 100 may be implemented by or within storage device 1206.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. An apparatus comprising:
one or more processors; and
memory storing executable instructions that, when executed by the one or more processors, cause the apparatus to:
obtain an image frame captured by an image capture system in accordance with an auto-exposure parameter set to a first setting, the image frame including a first image component associated with visible light and a second image component associated with non-visible light;
determine, based on the first image component, a first auto-exposure gain;
determine, based on the second image component, a second auto-exposure gain; and
determine, based on the first and second auto-exposure gains, a second setting for the auto-exposure parameter, the second setting configured to be used by the image capture system to capture a subsequent image frame;
wherein the determining the first auto-exposure gain includes:
detecting a first auto-exposure value for the first image component, the first auto-exposure value representing one or more auto exposure-related characteristics of the first image component,
accessing a first auto-exposure target for the first image component, the first auto-exposure target representing a target for the first auto-exposure value, and
determining the first auto-exposure gain based on the first auto-exposure target and the first auto-exposure value; and
wherein the determining the second auto-exposure gain includes:
detecting a second auto-exposure value for the second image component, the second auto-exposure value representing one or more auto exposure-related characteristics of the second image component,
accessing a second auto-exposure target for the second image component, the second auto-exposure target representing a target for the second auto-exposure value, and
determining the second auto-exposure gain based on the second auto-exposure target and the second auto-exposure value.

2. The apparatus of claim 1, wherein:
the non-visible light comprises fluorescence excitation illumination emitted at a wavelength included in an infrared light region; and
the second image component associated with the non-visible light shows fluorescence illumination emitted by a fluorescence imaging agent excited by the fluorescence excitation illumination.

3. The apparatus of claim 1, wherein:
the accessing the first auto-exposure target includes accessing data representative of a first user-selected setting indicative of a user preference for a luminance with which the first image component is to be presented; and
the accessing the second auto-exposure target includes accessing data representative of a second user-selected setting indicative of a user preference for a luminance with which the second image component is to be presented.

4. The apparatus of claim 1, wherein:
the determining the first auto-exposure gain is performed using a first auto-exposure gain algorithm; and the determining the second auto-exposure gain is performed using a second auto-exposure gain algorithm different from the first auto-exposure gain algorithm.

5. The apparatus of claim 4, wherein:
the first auto-exposure gain algorithm comprises:
    determining a component auto-exposure value for a set of pixels of the first image component, and
    determining the first auto-exposure gain based on the component auto-exposure value; and
the second auto-exposure gain algorithm comprises:
    differentiating, within a set of pixels of the second image component, signal pixels of the second image component from background pixels of the second image component,
    determining one or more of a signal auto-exposure value for the signal pixels or a background auto-exposure value for the background pixels, and
    determining the second auto-exposure gain based on one or more of the signal auto-exposure value or the background auto-exposure value.

6. The apparatus of claim 4, wherein:
the first auto-exposure gain algorithm comprises:
    determining a component auto-exposure value for a set of pixels of the first image component, and
    determining the first auto-exposure gain based on the component auto-exposure value; and
the second auto-exposure gain algorithm comprises:
    identifying, within the second image component, a signal region including pixels having auto-exposure values exceeding an auto-exposure value threshold,
    determining the second auto-exposure gain based on the auto-exposure values of the pixels of the identified signal region, and
    adjusting the auto-exposure value threshold based on a size of the signal region and in a manner that targets maintaining the size of the signal region at or above a signal region size threshold.

7. The apparatus of claim 1, wherein the auto-exposure parameter comprises an exposure time parameter corresponding to how long a shutter exposes an image sensor of the image capture system.

8. The apparatus of claim 1, wherein the auto-exposure parameter comprises an illumination intensity parameter corresponding to an illumination source of the image capture system.

9. The apparatus of claim 1, wherein the auto-exposure parameter comprises a gain parameter corresponding to one or more of an analog gain of the image capture system, an RGB gain of the image capture system, or a Bayer gain of the image capture system.

10. The apparatus of claim 1, wherein:
the instructions, when executed by the one or more processors, cause the apparatus to determine:
    a first tentative parameter setting for the auto-exposure parameter, the first tentative parameter setting associated with the first image component and based on the first auto-exposure gain, and
    a second tentative parameter setting for the auto-exposure parameter, the second tentative parameter setting associated with the second image component and based on the second auto-exposure gain; and
the determining the second setting for the auto-exposure parameter comprises merging the first and second tentative parameter settings.

11. The apparatus of claim 1, wherein the auto-exposure parameter comprises a shared auto-exposure parameter configured to be set with a single setting that influences both the first image component associated with the visible light and the second image component associated with the non-visible light.

12. The apparatus of claim 1, wherein the auto-exposure parameter comprises a non-shared auto-exposure parameter configured to be set with a dual setting that independently influences the first image component associated with the visible light and the second image component associated with the non-visible light.

13. The apparatus of claim 1, wherein:
the auto-exposure parameter is included in a set of auto-exposure parameters used by the image capture system to capture a series of image frames including the image frame and the subsequent image frame;
the instructions, when executed by the one or more processors, cause the apparatus to determine, based on the first and second auto-exposure gains and in a predetermined order, updated settings for each auto-exposure parameter in the set of auto-exposure parameters; and
the predetermined order in which the updated settings are determined is configured to maximize a signal integrity and minimize a noise level captured for the subsequent image frame.

14. The apparatus of claim 13, wherein an exposure time parameter corresponding to how long a shutter exposes an image sensor of the image capture system comes earlier in the predetermined order than a gain parameter corresponding to one or more of an analog gain of the image capture system, an RGB gain of the image capture system, or a Bayer gain of the image capture system.

15. The apparatus of claim 1, wherein the instructions, when executed by the one or more processors, cause the apparatus to update the auto-exposure parameter to the second setting such that the subsequent image frame will be captured in accordance with the auto-exposure parameter set to the second setting.

16. A method comprising:
determining, by a computing device and based on a first image component that is included in an image frame captured by an image capture system and that is associated with visible light, a first auto-exposure gain;
determining, by the computing device and based on a second image component that is included in the image frame and that is associated with non-visible light, a second auto-exposure gain; and
determining, by the computing device and based on the first and second auto-exposure gains, a setting for an auto-exposure parameter that is used by the image capture system to capture a subsequent image frame;
wherein the determining the first auto-exposure gain includes:
    detecting a first auto-exposure value for the first image component, the first auto-exposure value representing one or more auto exposure-related characteristics of the first image component,
    accessing a first auto-exposure target for the first image component, the first auto-exposure target representing a target for the first auto-exposure value, and
    determining the first auto-exposure gain based on the first auto-exposure target and the first auto-exposure value; and
wherein the determining the second auto-exposure gain includes:
    detecting a second auto-exposure value for the second image component, the second auto-exposure value representing one or more auto exposure-related characteristics of the second image component, accessing a second auto-exposure target for the second image component, the second auto-exposure target representing a target for the second auto-exposure value, and determining the second auto-exposure gain based on the second auto-exposure target and the second auto-exposure value.

17. The method of claim 16, further comprising independently determining, by the computing device, a first tentative parameter setting for the auto-exposure parameter and a second tentative parameter setting for the auto-exposure parameter;

wherein:
the first tentative parameter setting is associated with the first image component and is based on the first auto-exposure gain,
the second tentative parameter setting is associated with the second image component and is based on the second auto-exposure gain, and
the determining the setting for the auto-exposure parameter comprises merging the first and second tentative parameter settings.

18. A system comprising:
a first illumination source configured to illuminate tissue within a body with visible light during a performance of a medical procedure;
a second illumination source configured to illuminate the tissue with non-visible light during the performance of the medical procedure;
an image capture device configured to capture an image frame in accordance with an auto-exposure parameter set to a first setting, the image frame depicting an internal view of the body that features the tissue illuminated by the first and second illumination sources; and
one or more processors configured to:
determine, based on a first image component that is included in the image frame and that is associated with the visible light, a first auto-exposure gain;
determine, based on a second image component that is included in the image frame and that is associated with the non-visible light, a second auto-exposure gain; and
determine, based on the first and second auto-exposure gains, a second setting for the auto-exposure parameter, the second setting configured to be used by the image capture device to capture a subsequent image frame;

wherein the determining the first auto-exposure gain includes:
detecting a first auto-exposure value for the first image component, the first auto-exposure value representing one or more auto exposure-related characteristics of the first image component,
accessing a first auto-exposure target for the first image component, the first auto-exposure target representing a target for the first auto-exposure value, and
determining the first auto-exposure gain based on the first auto-exposure target and the first auto-exposure value; and wherein the determining the second auto-exposure gain includes:
detecting a second auto-exposure value for the second image component, the second auto-exposure value representing one or more auto exposure-related characteristics of the second image component,
accessing a second auto-exposure target for the second image component, the second auto-exposure target representing a target for the second auto-exposure value, and
determining the second auto-exposure gain based on the second auto-exposure target and the second auto-exposure value.

19. The system of claim 18, wherein:
the one or more processors are configured to determine:
a first tentative parameter setting for the auto-exposure parameter, the first tentative parameter setting associated with the first image component and based on the first auto-exposure gain, and
a second tentative parameter setting for the auto-exposure parameter, the second tentative parameter setting associated with the second image component and based on the second auto-exposure gain; and
the determining the second setting for the auto-exposure parameter comprises merging the first and second tentative parameter settings.

* * * * *